(12) United States Patent
Miyashita et al.

(10) Patent No.: US 7,869,327 B2
(45) Date of Patent: Jan. 11, 2011

(54) PHASE ERROR DETECTING DEVICE, WAVEFORM SHAPING DEVICE AND OPTICAL DISC DEVICE

(75) Inventors: Harumitsu Miyashita, Nara (JP); Kohei Nakata, Nara (JP)

(73) Assignee: Panasonic Corporation, Osaka (JP)

( * ) Notice: Subject to any disclaimer, the term of this patent is extended or adjusted under 35 U.S.C. 154(b) by 145 days.

(21) Appl. No.: 12/343,894

(22) Filed: Dec. 24, 2008

(65) Prior Publication Data

US 2009/0180368 A1 Jul. 16, 2009

(30) Foreign Application Priority Data

Dec. 28, 2007 (JP) .............................. 2007-339921

(51) Int. Cl.
*G11B 27/36* (2006.01)

(52) U.S. Cl. ..................... 369/53.35; 375/226; 375/341

(58) Field of Classification Search ............... 369/53.35
See application file for complete search history.

(56) References Cited

U.S. PATENT DOCUMENTS

| | | | |
|---|---|---|---|
| 7,385,900 B2 * | 6/2008 | Tonami | 369/59.22 |
| 7,483,478 B2 * | 1/2009 | Kikugawa et al. | 375/229 |
| 2006/0153041 A1 | 7/2006 | Miyashita et al. | |

FOREIGN PATENT DOCUMENTS

| | | |
|---|---|---|
| JP | 2003-85764 | 3/2003 |
| JP | 2003-141823 | 5/2003 |
| JP | 2004-335079 | 11/2004 |
| JP | 2006-504217 | 2/2006 |

OTHER PUBLICATIONS

Hiroshi Ogawa et al., "Illustrated Reading Material about Blu-ray Disc", Dec. 10, 2006, from Ohmsha, pp. 146-147 (along with partial English translation).
Hiroshi Ogawa et al., "Illustrated Reading Material about Blu-ray Disc", Dec. 10, 2006, from Ohmsha, p. 247 (along with partial English translation).
Yoji Iikuni, "Adaptive Signal Processing Algorism", Jul. 2000, from Baifu-kan, pp. 33-34, (along with partial English translation).

* cited by examiner

*Primary Examiner*—Aristotelis Psitos
(74) *Attorney, Agent, or Firm*—Wenderoth, Lind & Ponack, L.L.P.

(57) ABSTRACT

A waveform shaping portion receives a digital reproduced signal generated from an analog reproduced signal reproduced from an information recording medium and shapes the waveform of the digital reproduced signal. A maximum likelihood decoding portion applies maximum likelihood decoding to the digital reproduced signal in the shaped waveform and generates a binarized signal indicating the result of the maximum likelihood decoding. A phase detection portion extracts, during the maximum likelihood decoding, a phase error using state transition patterns having only a single zero cross point among differential metrics at a plurality of merging points at which a set of paths branched from a given state merges. A synchronization detection portion generates a reproduction clock signal using the phase error that has been detected and brings the digital reproduced signal into synchronization with the reproduction clock signal that has been generated. This configuration makes it possible to generate a reproduction clock signal in a stable manner.

6 Claims, 14 Drawing Sheets

FREQUENCY DISTRIBUTION OF PHASE ERROR 401  402  403

PHASE ERROR DETECTING DEVICE, WAVEFORM SHAPING DEVICE AND OPTICAL DISC DEVICE

BACKGROUND OF THE INVENTION

1. Field of the Invention

The present invention relates to a phase error detecting device, a waveform shaping device, and an optical disc device for reproducing a signal recorded over the limit of optical resolution, and more particularly, to a phase error detecting device, a waveform shaping device, and an optical disc device for performing phase synchronization on a reproduced signal using maximum likelihood decoding, such as Viterbi decoding.

2. Description of the Background Art

Recently, the shortest mark length in recording is nearing the limit of optical resolution because of the density of an optical disc that is becoming higher and higher. An increase in intersymbol interference and deterioration of SNR (Signal Noise Rate) are therefore becoming more noticeable. Under these circumstances, it is becoming popular to adopt PRML (Partial Response Maximum Likelihood) as a signal processing method. PRML is a technique combining partial response (PR) and maximum likelihood decoding (ML). It is a method for selecting a most likely signal sequence from a reproduced waveform based on the premise that known intersymbol interference will occur. This method is therefore known to achieve better performance than a conventional level determination method.

Meanwhile, a shift of the signal processing method from the level determination method to PRML poses a problem as to an evaluation method of a reproduced signal. Jitter, which is a reproduced signal evaluation index that has been used conventionally, is premised on the signal processing by the level evaluation method. Accordingly, there are cases where jitter is not correlated with the performance of PRML that uses a different signal processing algorithm from the one used in the level determination method. Under these circumstances, various new indices correlated with the performance of PRML have been proposed (see, for example, JP-A-2003-141823).

Also, a new index that enables a detection of displacement (edge shifting) between marks and spaces, which is crucial to the recording quality of an optical disc, is now being proposed. When PRML is adopted, this index should also be in conformity with the concept of PRML, correlated with the performance of PRML, and able to indicate a direction and an amount of edge shifting quantitatively pattern by pattern (see, for example, JP-A-2004-335079).

In addition, as an optical disc becomes further denser, intersymbol interference and deterioration of SNR will increase. In this case, it is possible to maintain the system margin by adopting high-order PRML. For example, an optical disc having a diameter of 12 cm and a recording capacity of 25 GB per layer is able to maintain the system margin by adopting PR 1221 ML. However, it is necessary to adopt PR 12221 ML for an optical disc having a recording capacity of 33.3 GB per layer. In view of the foregoing, it is anticipated that the tendency to adopt PRML at an order proportionately high to higher densities will continue.

Adopting high-order PRML suitable to intersymbol interference in response to enhancement of the recording line density can be described as a method for recognizing a reproduced waveform using a waveform pattern in a longer period in order to identify a reproduced signal from influences of intersymbol interference by increasing the identification resolution of the amplitude level of the reproduced waveform. For example, PR 12221 ML is PRML at a higher order than PR 1221 ML. Hence, by selecting suitable PRML according to a transmission path for influences of intersymbol interference caused by enhancement of the recording line density, it is possible to ensure the reproduction performance.

An optical disc recording and reproducing device has to generate a reproduction clock signal in synchronization with a reproduced signal during the reproduction and to decode the reproduced signal into a binary digital signal in synchronization with the reproduction clock signal. Generally, information about a reproduction clock signal is contained at the edge of a recording mark. The optical disc recording and reproducing device therefore generates the reproduction clock signal by detecting phase information about leading or lagging of the edge. However, in a case where a signal recorded, for example, at a recoding line density exceeding the limit of optical resolution is to be reproduced, there is a case where a reproduction clock signal cannot be generated because the optical disc recording and reproducing device fails to detect the phase information contained at the edge appropriately due to influences of intersymbol interference.

SUMMARY OF THE INVENTION

The invention was devised to solve the problems discussed above and has an object to provide a phase error detecting device, a waveform shaping device, and an optical disc device each capable of generating a reproduction clock signal in a stable manner.

A phase error detecting device according to an aspect of the invention includes: a waveform shaping portion that receives a digital reproduced signal generated from an analog reproduced signal reproduced from an information recording medium and shapes a waveform of the digital reproduced signal; a maximum likelihood decoding portion that applies maximum likelihood decoding to the digital reproduced signal in the waveform shaped by the waveform shaping portion and generates a binarized signal indicating a result of the maximum likelihood decoding; a phase detection portion that detects a phase error on the basis of the digital reproduced signal in the waveform shaped by the waveform shaping portion and the binarized signal generated by the maximum likelihood decoding portion; and a synchronization detection portion that generates a reproduction clock signal using the phase error detected by the phase detection portion and brings the digital reproduced signal in synchronization with the reproduction clock signal that has been generated. The phase detection portion extracts, during the maximum likelihood decoding, the phase error using state transition patterns having only a single zero cross point among differential metrics at a plurality of merging points at which a set of paths branched from a given state merges.

According to this configuration, a digital reproduced signal generated from an analog reproduced signal reproduced from an information recording medium is received and the waveform of the digital reproduced signal is shaped by the waveform shaping portion. The digital reproduced signal in the shaped waveform is then subjected to maximum likelihood decoding by the maximum likelihood decoding portion. A binarized signal indicating the result of the maximum likelihood decoding is thus generated by the maximum likelihood decoding portion. Thereafter, a phase error is detected by the phase detection portion on the basis of the digital reproduced signal in the shaped waveform and the binarized signal that has been generated. In this instance, the phase error is extracted during the maximum likelihood decoding using the state transition patterns having only a single zero cross point among the differential metrics at a plurality of merging points at which a set of paths branched from a given state merges. A reproduction clock signal is then generated using the phase error that has been detected and the digital reproduced signal is brought into synchronization with the reproduction clock signal that has been generated by the synchronization detection portion.

Accordingly, the phase error is extracted during the maximum likelihood decoding using the state transition patterns having only a single zero cross point among the differential metrics at a plurality of merging points at which a set of paths branched from a given state merges. Accuracy in detecting the phase error can be therefore enhanced, which makes it possible to generate a reproduction clock signal in a stable manner.

DETAILED DESCRIPTION OF THE PREFERRED EMBODIMENTS OF THE INVENTION

Hereinafter, embodiments of the invention will be described with reference to the drawings. It should be appreciated that embodiments below are concrete examples of the invention and are not intended to limit the technical scope of the invention.

Before descriptions of the embodiments, an edge shifting detection method for a recording mark using PRML, which is the point of the invention, will be described in the following.

A concrete optical disc device adopts PR 12221 ML as the signal processing in a reproduction system and uses codes, such as an RLL (Run Length Limited) (1, 7) code, as a recording code. Firstly, PR 12221 ML will be briefly described using FIG. 1 and FIG. 2.

According to PR 12221 ML, the number of states in the decoding portion is limited to 10 due to the combination of RLL (1, 7). The number of paths of state transition in PR 12221 ML is 16 and the reproduction level includes nine levels.

Figure 1:
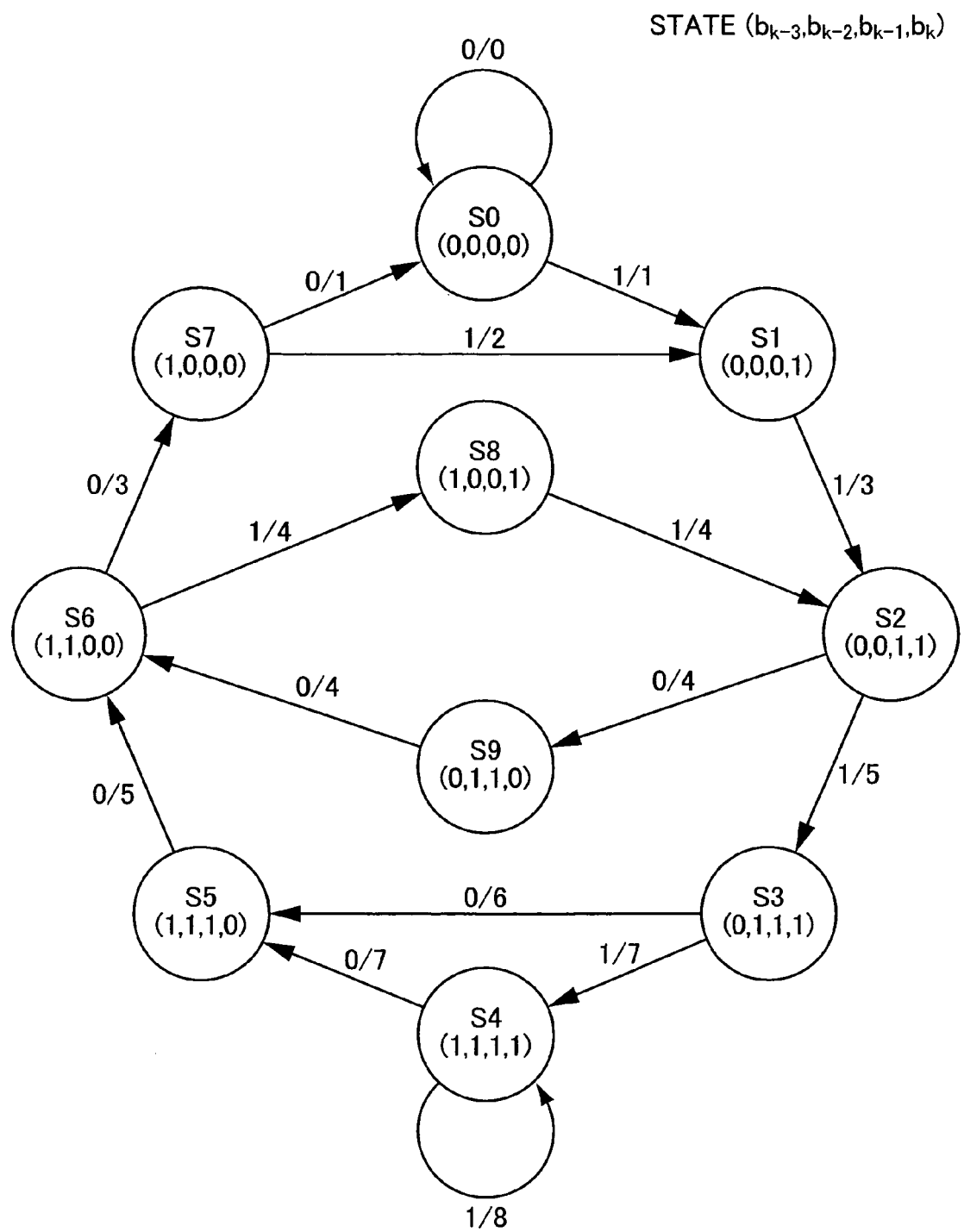
FIG. 1 is a state transition diagram indicating a state transition rule determined from an RLL (1, 7) recoding code and equalization PR 12221 ML.

FIG. 1 is a state transition diagram showing a state transition rule determined by the RLL (1, 7) recording code and PR 12221 ML. FIG. 1 shows a state transition diagram generally used when PRML is described. Herein, 10 states are expressed as follows by denoting a state S (0, 0, 0, 0) at a given time as S0, a state S (0, 0, 0, 1) as S1, a state S (0, 0, 1, 1,) as S2, a state S (0, 1, 1, 1) as S3, a state S (1, 1, 1, 1) as S4, a state S (1, 1, 1, 0) as S5, a state S (1, 1, 0, 0) as S6, a state S (1, 0, 0, 0) as S7, a state S (1, 0, 0, 1) as S8, and a state S (0, 1, 1, 0) as S9. Herein, "0" or "1" inside the parentheses in FIG. 1 represents a signal sequence on the time axis and specifies a state of the possibility of transition from one state to another in the following time. Also, a trellis diagram as shown in FIG. 2 is obtained by developing the state transition diagram of FIG. 1 with respect to the time axis.

Figure 2:
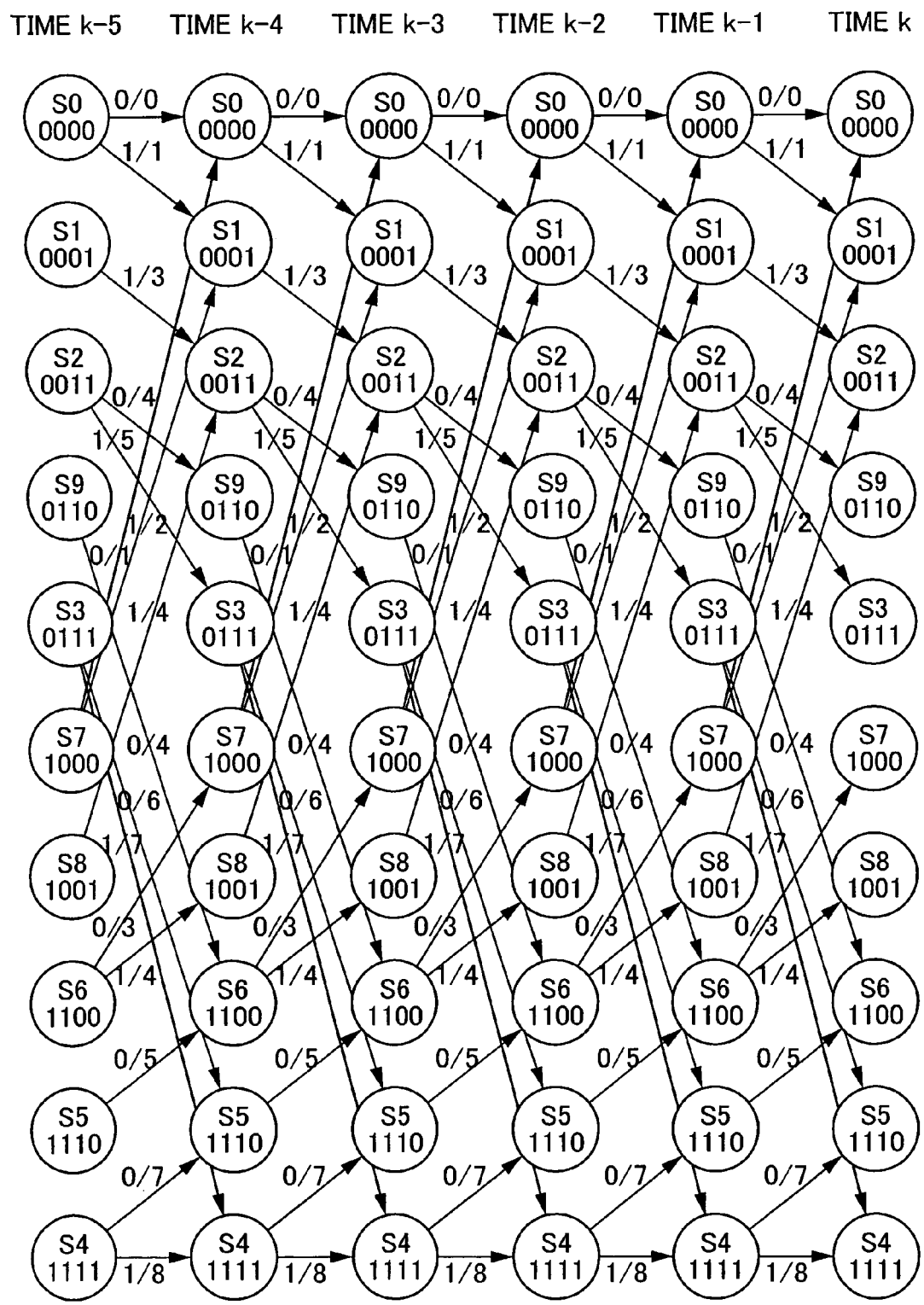
FIG. 2 is a trellis diagram when the state transition diagram shown in FIG. 1 is developed with respect to a time axis.

FIG. 2 is a trellis diagram obtained by developing the state transition diagram shown in FIG. 1 with respect to the time axis. In the state transition of PR 12221 ML as shown in FIG. 2, there are a myriad of state transition patterns (combinations of states) that can take two state transitions when a predetermined state at a given time transitions to another predetermined state at a different time. When attention is paid to particularly error-prone state transition patterns within a limited time range, the state transition patters are those as set forth as in Tables 1, 2, and 3 below in the case of PR 12221 ML.

TABLE 1

| STATE TRANSITION | RECORDING CODE $(b_{k-i}, \ldots, b_k)$ | k − 9 | k − 8 | k − 7 | k − 6 | k − 5 | k − 4 | k − 3 |
|---|---|---|---|---|---|---|---|---|
| $S0_{k-5} \to S6_k$ | (0, 0, 0, 0, 1, 1, 1, 0, 0) | | | | | S0 | S1 | S2 |
| | (0, 0, 0, 0, 0, 1, 1, 0, 0) | | | | | S0 | S0 | S1 |

TABLE 1-continued

| | | | | |
|---|---|---|---|---|
| S0$_{k-5}$ → S5$_k$ | (0, 0, 0, 0, 1, 1, 1, 1, 0) | S0 | S1 | S2 |
| | (0, 0, 0, 0, 0, 1, 1, 1, 0) | S0 | S0 | S1 |
| S0$_{k-5}$ → S4$_k$ | (0, 0, 0, 0, 1, 1, 1, 1, 1) | S0 | S1 | S2 |
| | (0, 0, 0, 0, 0, 1, 1, 1, 1) | S0 | S0 | S1 |
| S2$_{k-5}$ → S0$_k$ | (0, 0, 1, 1, 1, 0, 0, 0, 0) | S2 | S3 | S5 |
| | (0, 0, 1, 1, 0, 0, 0, 0, 0) | S2 | S9 | S6 |
| S2$_{k-5}$ → S1$_k$ | (0, 0, 1, 1, 1, 0, 0, 0, 1) | S2 | S3 | S5 |
| | (0, 0, 1, 1, 0, 0, 0, 0, 1) | S2 | S9 | S6 |
| S2$_{k-5}$ → S2$_k$ | (0, 0, 1, 1, 1, 0, 0, 1, 1) | S2 | S3 | S5 |
| | (0, 0, 1, 1, 0, 0, 0, 1, 1) | S2 | S9 | S6 |
| S3$_{k-5}$ → S0$_k$ | (0, 1, 1, 1, 1, 0, 0, 0, 0) | S3 | S4 | S5 |
| | (0, 1, 1, 1, 0, 0, 0, 0, 0) | S3 | S5 | S6 |
| S3$_{k-5}$ → S1$_k$ | (0, 1, 1, 1, 1, 0, 0, 0, 1) | S3 | S4 | S5 |
| | (0, 1, 1, 1, 0, 0, 0, 0, 1) | S3 | S5 | S6 |
| S3$_{k-5}$ → S2$_k$ | (0, 1, 1, 1, 1, 0, 0, 1, 1) | S3 | S4 | S5 |
| | (0, 1, 1, 1, 0, 0, 0, 1, 1) | S3 | S5 | S6 |
| S7$_{k-5}$ → S6$_k$ | (1, 0, 0, 0, 1, 1, 1, 0, 0) | S7 | S1 | S2 |
| | (1, 0, 0, 0, 0, 1, 1, 0, 0) | S7 | S0 | S1 |
| S7$_{k-5}$ → S5$_k$ | (1, 0, 0, 0, 1, 1, 1, 1, 0) | S7 | S1 | S2 |
| | (1, 0, 0, 0, 0, 1, 1, 1, 0) | S7 | S0 | S1 |
| S7$_{k-5}$ → S4$_k$ | (1, 0, 0, 0, 1, 1, 1, 1, 1) | S7 | S1 | S2 |
| | (1, 0, 0, 0, 0, 1, 1, 1, 1) | S7 | S0 | S1 |
| S6$_{k-5}$ → S6$_k$ | (1, 1, 0, 0, 1, 1, 1, 0, 0) | S6 | S8 | S2 |
| | (1, 0, 0, 0, 1, 1, 1, 0, 0) | S6 | S7 | S1 |
| S6$_{k-5}$ → S5$_k$ | (1, 1, 0, 0, 1, 1, 1, 1, 0) | S6 | S8 | S2 |
| | (1, 0, 0, 0, 1, 1, 1, 1, 0) | S6 | S7 | S1 |
| S6$_{k-5}$ → S4$_k$ | (1, 1, 0, 0, 1, 1, 1, 1, 1) | S6 | S8 | S2 |
| | (1, 0, 0, 0, 1, 1, 1, 1, 1) | S6 | S7 | S1 |
| S4$_{k-5}$ → S0$_k$ | (1, 1, 1, 1, 1, 0, 0, 0, 0) | S4 | S4 | S5 |
| | (1, 1, 1, 1, 0, 0, 0, 0, 0) | S4 | S5 | S6 |
| S4$_{k-5}$ → S1$_k$ | (1, 1, 1, 1, 1, 0, 0, 0, 1) | S4 | S4 | S5 |
| | (1, 1, 1, 1, 0, 0, 0, 0, 1) | S4 | S5 | S6 |
| S4$_{k-5}$ → S2$_k$ | (1, 1, 1, 1, 1, 0, 0, 1, 1) | S4 | S4 | S5 |
| | (1, 1, 1, 1, 0, 0, 0, 1, 1) | S4 | S5 | S6 |

| STATE TRANSITION | k − 2 | k − 1 | k | PR EQUALIZATION IDEAL VALUE | | | | | EUCLIDEAN DISTANCE BETWEEN PATHS |
|---|---|---|---|---|---|---|---|---|---|
| S0$_{k-5}$ → S6$_k$ | S3 | S5 | S6 | 1 | 3 | 5 | 6 | 5 | |
| | S2 | S9 | S6 | 0 | 1 | 3 | 4 | 5 | 14 |
| S0$_{k-5}$ → S5$_k$ | S3 | S4 | S5 | 1 | 3 | 5 | 7 | 8 | |
| | S2 | S3 | S5 | 0 | 1 | 3 | 5 | 7 | 14 |
| S0$_{k-5}$ → S4$_k$ | S3 | S4 | S4 | 1 | 3 | 5 | 7 | 8 | |
| | S2 | S3 | S4 | 0 | 1 | 3 | 5 | 7 | 14 |
| S2$_{k-5}$ → S0$_k$ | S6 | S7 | S0 | 5 | 6 | 5 | 3 | 1 | |
| | S7 | S0 | S0 | 4 | 4 | 3 | 1 | 0 | 14 |
| S2$_{k-5}$ → S1$_k$ | S6 | S7 | S1 | 5 | 6 | 5 | 3 | 2 | |
| | S7 | S0 | S1 | 4 | 4 | 3 | 1 | 1 | 14 |
| S2$_{k-5}$ → S2$_k$ | S6 | S8 | S2 | 5 | 6 | 5 | 4 | 4 | |
| | S7 | S1 | S2 | 4 | 4 | 3 | 2 | 3 | 14 |
| S3$_{k-5}$ → S0$_k$ | S6 | S7 | S0 | 7 | 7 | 5 | 3 | 1 | |
| | S7 | S0 | S0 | 6 | 5 | 3 | 1 | 0 | 14 |
| S3$_{k-5}$ → S1$_k$ | S6 | S7 | S1 | 7 | 7 | 5 | 3 | 2 | |
| | S7 | S0 | S1 | 6 | 5 | 3 | 1 | 1 | 14 |
| S3$_{k-5}$ → S2$_k$ | S6 | S8 | S2 | 7 | 7 | 5 | 4 | 4 | |
| | S7 | S1 | S2 | 6 | 5 | 3 | 2 | 3 | 14 |
| S7$_{k-5}$ → S6$_k$ | S3 | S5 | S6 | 2 | 3 | 5 | 6 | 5 | |
| | S2 | S9 | S6 | 1 | 1 | 3 | 4 | 4 | 14 |
| S7$_{k-5}$ → S5$_k$ | S3 | S4 | S5 | 2 | 3 | 5 | 7 | 7 | |
| | S2 | S3 | S5 | 1 | 1 | 3 | 5 | 6 | 14 |
| S7$_{k-5}$ → S4$_k$ | S3 | S4 | S4 | 2 | 3 | 5 | 7 | 8 | |
| | S2 | S3 | S4 | 1 | 1 | 3 | 5 | 7 | 14 |
| S6$_{k-5}$ → S6$_k$ | S3 | S5 | S6 | 4 | 4 | 5 | 6 | 5 | |
| | S2 | S9 | S6 | 3 | 2 | 3 | 4 | 4 | 14 |
| S6$_{k-5}$ → S5$_k$ | S3 | S4 | S5 | 4 | 4 | 5 | 7 | 7 | |
| | S2 | S3 | S5 | 3 | 2 | 3 | 5 | 6 | 14 |
| S6$_{k-5}$ → S4$_k$ | S3 | S4 | S4 | 4 | 4 | 5 | 7 | 8 | |
| | S2 | S3 | S4 | 3 | 2 | 3 | 5 | 7 | 14 |
| S4$_{k-5}$ → S0$_k$ | S6 | S7 | S0 | 8 | 7 | 5 | 3 | 1 | |
| | S7 | S0 | S0 | 7 | 5 | 3 | 1 | 0 | 14 |
| S4$_{k-5}$ → S1$_k$ | S6 | S7 | S1 | 8 | 7 | 5 | 3 | 2 | |
| | S7 | S0 | S1 | 7 | 5 | 3 | 1 | 1 | 14 |
| S4$_{k-5}$ → S2$_k$ | S6 | S8 | S2 | 8 | 7 | 5 | 4 | 4 | |
| | S7 | S1 | S2 | 7 | 5 | 3 | 2 | 3 | 14 |

TABLE 2

| STATE TRANSITION | RECORDING CODE $(b_{k-i}, \ldots, b_k)$ | k − 9 | k − 8 | k − 7 | k − 6 | k − 5 | k − 4 | k − 3 |
|---|---|---|---|---|---|---|---|---|
| $S0_{k-7} \to S0_k$ | (0, 0, 0, 0, 1, 1, 0, 0, 0, 0) | | | S0 | S1 | S2 | S9 | S6 |
| | (0, 0, 0, 0, 0, 1, 1, 0, 0, 0) | | | S0 | S0 | S1 | S2 | S9 |
| $S0_{k-7} \to S1_k$ | (0, 0, 0, 0, 1, 1, 0, 0, 0, 1) | | | S0 | S1 | S2 | S9 | S6 |
| | (0, 0, 0, 0, 0, 1, 1, 0, 0, 1) | | | S0 | S0 | S1 | S2 | S9 |
| $S0_{k-7} \to S2_k$ | (0, 0, 0, 0, 1, 1, 0, 0, 1, 1) | | | S0 | S1 | S2 | S9 | S6 |
| | (0, 0, 0, 0, 0, 1, 1, 0, 1, 1) | | | S0 | S0 | S1 | S2 | S9 |
| $S2_{k-7} \to S6_k$ | (0, 0, 1, 1, 1, 0, 0, 1, 1, 0, 0) | | | S2 | S3 | S5 | S6 | S8 |
| | (0, 0, 1, 1, 0, 0, 1, 1, 1, 0, 0) | | | S2 | S9 | S6 | S8 | S2 |
| $S2_{k-7} \to S5_k$ | (0, 0, 1, 1, 1, 0, 0, 1, 1, 1, 0) | | | S2 | S3 | S5 | S6 | S8 |
| | (0, 0, 1, 1, 0, 0, 1, 1, 1, 1, 0) | | | S2 | S9 | S6 | S8 | S2 |
| $S2_{k-7} \to S4_k$ | (0, 0, 1, 1, 1, 0, 0, 1, 1, 1, 1) | | | S2 | S3 | S5 | S6 | S8 |
| | (0, 0, 1, 1, 0, 0, 1, 1, 1, 1, 1) | | | S2 | S9 | S6 | S8 | S2 |
| $S3_{k-7} \to S6_k$ | (0, 1, 1, 1, 1, 0, 0, 1, 1, 0, 0) | | | S3 | S4 | S5 | S6 | S8 |
| | (0, 1, 1, 1, 1, 0, 0, 1, 1, 0, 0) | | | S3 | S5 | S6 | S8 | S2 |
| $S3_{k-7} \to S5_k$ | (0, 1, 1, 1, 1, 0, 0, 1, 1, 1, 0) | | | S3 | S4 | S5 | S6 | S8 |
| | (0, 1, 1, 1, 1, 0, 0, 1, 1, 1, 0) | | | S3 | S5 | S6 | S8 | S2 |
| $S3_{k-7} \to S4_k$ | (0, 1, 1, 1, 1, 0, 0, 1, 1, 1, 1) | | | S3 | S4 | S5 | S6 | S8 |
| | (0, 1, 1, 1, 1, 0, 0, 1, 1, 1, 1) | | | S3 | S5 | S6 | S8 | S2 |
| $S7_{k-7} \to S0_k$ | (1, 0, 0, 0, 1, 1, 0, 0, 0, 0) | | | S7 | S1 | S2 | S9 | S6 |
| | (1, 0, 0, 0, 0, 1, 1, 0, 0, 0, 0) | | | S7 | S0 | S1 | S2 | S9 |
| $S7_{k-7} \to S1_k$ | (1, 0, 0, 0, 1, 1, 0, 0, 0, 0, 1) | | | S7 | S1 | S2 | S9 | S6 |
| | (1, 0, 0, 0, 0, 1, 1, 0, 0, 0, 1) | | | S7 | S0 | S1 | S2 | S9 |
| $S7_{k-7} \to S2_k$ | (1, 0, 0, 0, 1, 1, 0, 0, 0, 1, 1) | | | S7 | S1 | S2 | S9 | S6 |
| | (1, 0, 0, 0, 0, 1, 1, 0, 0, 1, 1) | | | S7 | S0 | S1 | S2 | S9 |
| $S6_{k-7} \to S0_k$ | (1, 1, 0, 0, 1, 1, 0, 0, 0, 0, 0) | | | S6 | S8 | S2 | S9 | S6 |
| | (1, 1, 0, 0, 0, 1, 1, 0, 0, 0, 0) | | | S6 | S7 | S1 | S2 | S9 |
| $S6_{k-7} \to S1_k$ | (1, 1, 0, 0, 1, 1, 0, 0, 0, 0, 1) | | | S6 | S8 | S2 | S9 | S6 |
| | (1, 1, 0, 0, 0, 1, 1, 0, 0, 0, 1) | | | S6 | S7 | S1 | S2 | S9 |
| $S6_{k-7} \to S2_k$ | (1, 1, 0, 0, 1, 1, 0, 0, 0, 1, 1) | | | S6 | S8 | S2 | S9 | S6 |
| | (1, 1, 0, 0, 0, 1, 1, 0, 0, 1, 1) | | | S6 | S7 | S1 | S2 | S9 |
| $S4_{k-7} \to S6_k$ | (1, 1, 1, 1, 1, 0, 0, 1, 1, 0, 0) | | | S4 | S4 | S5 | S6 | S8 |
| | (1, 1, 1, 1, 0, 0, 1, 1, 1, 0, 0) | | | S4 | S5 | S6 | S8 | S2 |
| $S4_{k-7} \to S5_k$ | (1, 1, 1, 1, 1, 0, 0, 1, 1, 1, 0) | | | S4 | S4 | S5 | S6 | S8 |
| | (1, 1, 1, 1, 0, 0, 1, 1, 1, 1, 0) | | | S4 | S5 | S6 | S8 | S2 |
| $S4_{k-7} \to S4_k$ | (1, 1, 1, 1, 1, 0, 0, 1, 1, 1, 1) | | | S4 | S4 | S5 | S6 | S8 |
| | (1, 1, 1, 1, 0, 0, 1, 1, 1, 1, 1) | | | S4 | S5 | S6 | S8 | S2 |

| STATE TRANSITION | k − 2 | k − 1 | k | PR EQUALIZATION IDEAL VALUE | | | | | | EUCLIDEAN DISTANCE BETWEEN PATHS |
|---|---|---|---|---|---|---|---|---|---|---|
| $S0_{k-7} \to S0_k$ | S7 | S0 | S0 | 1 | 3 | 4 | 4 | 3 | 1 | 0 | |
| | S6 | S7 | S0 | 0 | 1 | 3 | 4 | 4 | 3 | 1 | 12 |
| $S0_{k-7} \to S1_k$ | S7 | S0 | S1 | 1 | 3 | 4 | 4 | 3 | 1 | 1 | |
| | S6 | S7 | S1 | 0 | 1 | 3 | 4 | 4 | 3 | 2 | 12 |
| $S0_{k-7} \to S2_k$ | S7 | S1 | S2 | 1 | 3 | 4 | 3 | 2 | 3 | | |
| | S6 | S8 | S2 | 0 | 1 | 3 | 4 | 4 | 4 | 4 | 12 |
| $S2_{k-7} \to S6_k$ | S2 | S9 | S6 | 5 | 6 | 5 | 4 | 4 | 4 | 4 | |
| | S3 | S5 | S6 | 4 | 4 | 4 | 5 | 6 | 5 | | 12 |
| $S2_{k-7} \to S5_k$ | S2 | S3 | S5 | 5 | 6 | 5 | 4 | 4 | 5 | 6 | |
| | S3 | S4 | S5 | 4 | 4 | 4 | 5 | 7 | 7 | | 12 |
| $S2_{k-7} \to S4_k$ | S2 | S3 | S4 | 5 | 6 | 5 | 4 | 4 | 5 | 7 | |
| | S3 | S4 | S4 | 4 | 4 | 4 | 5 | 7 | 8 | | 12 |
| $S3_{k-7} \to S6_k$ | S2 | S9 | S6 | 7 | 7 | 5 | 4 | 4 | 4 | 4 | |
| | S3 | S5 | S6 | 6 | 5 | 4 | 4 | 5 | 6 | 5 | 12 |
| $S3_{k-7} \to S5_k$ | S2 | S3 | S5 | 7 | 7 | 5 | 4 | 4 | 5 | 6 | |
| | S3 | S4 | S5 | 6 | 5 | 4 | 4 | 5 | 7 | 7 | 12 |
| $S3_{k-7} \to S4_k$ | S2 | S3 | S4 | 7 | 7 | 5 | 4 | 4 | 5 | 7 | |
| | S3 | S4 | S4 | 6 | 5 | 4 | 4 | 5 | 7 | 8 | 12 |
| $S7_{k-7} \to S0_k$ | S7 | S0 | S0 | 2 | 3 | 4 | 4 | 3 | 1 | 0 | |
| | S6 | S7 | S0 | 1 | 1 | 3 | 4 | 4 | 3 | 1 | 12 |
| $S7_{k-7} \to S1_k$ | S7 | S0 | S1 | 2 | 3 | 4 | 4 | 3 | 1 | 1 | |
| | S6 | S7 | S1 | 1 | 1 | 3 | 4 | 4 | 3 | 2 | 12 |
| $S7_{k-7} \to S2_k$ | S7 | S1 | S2 | 2 | 3 | 4 | 4 | 3 | 2 | 3 | |
| | S6 | S8 | S2 | 1 | 1 | 3 | 4 | 4 | 4 | 4 | 12 |
| $S6_{k-7} \to S0_k$ | S7 | S0 | S0 | 4 | 4 | 4 | 4 | 3 | 1 | 0 | |
| | S6 | S7 | S0 | 3 | 2 | 3 | 4 | 4 | 3 | 1 | 12 |
| $S6_{k-7} \to S1_k$ | S7 | S0 | S1 | 4 | 4 | 4 | 4 | 3 | 1 | 1 | |
| | S6 | S7 | S1 | 3 | 2 | 3 | 4 | 4 | 3 | 2 | 12 |
| $S6_{k-7} \to S2_k$ | S7 | S1 | S2 | 4 | 4 | 4 | 4 | 3 | 2 | 3 | |
| | S6 | S8 | S2 | 3 | 2 | 3 | 4 | 4 | 4 | 4 | 12 |
| $S4_{k-7} \to S6_k$ | S2 | S9 | S6 | 8 | 7 | 5 | 4 | 4 | 4 | 4 | |
| | S3 | S5 | S6 | 7 | 5 | 4 | 4 | 5 | 6 | 5 | 12 |
| $S4_{k-7} \to S5_k$ | S2 | S3 | S5 | 8 | 7 | 5 | 4 | 4 | 5 | 6 | |
| | S3 | S4 | S5 | 7 | 5 | 4 | 4 | 5 | 7 | 7 | 12 |
| $S4_{k-7} \to S4_k$ | S2 | S3 | S4 | 8 | 7 | 5 | 4 | 4 | 5 | 7 | |
| | S3 | S4 | S4 | 7 | 5 | 4 | 4 | 5 | 7 | 8 | 12 |

TABLE 3

| STATE TRANSITION | RECORDING CODE $(b_{k-i}, \ldots, b_k)$ | k − 9 | k − 8 | k − 7 | k − 6 | k − 5 | k − 4 | k − 3 | k − 2 |
|---|---|---|---|---|---|---|---|---|---|
| $S0_{k-9} \to S6_k$ | (0, 0, 0, 0, 1, 1, 0, 0, 1, 1, 1, 0, 0) | S0 | S1 | S2 | S9 | S6 | S8 | S2 | S3 |
| | (0, 0, 0, 0, 0, 1, 1, 0, 0, 1, 1, 0, 0) | S0 | S0 | S1 | S2 | S9 | S6 | S8 | S3 |
| $S0_{k-9} \to S5_k$ | (0, 0, 0, 0, 1, 1, 0, 0, 1, 1, 1, 0, 1) | S0 | S1 | S2 | S9 | S6 | S8 | S2 | S3 |
| | (0, 0, 0, 0, 0, 1, 1, 0, 0, 1, 1, 0, 1) | S0 | S0 | S1 | S2 | S9 | S6 | S8 | S2 |
| $S0_{k-9} \to S4_k$ | (0, 0, 0, 0, 1, 1, 0, 0, 1, 1, 1, 1, 1) | S0 | S1 | S2 | S9 | S6 | S8 | S2 | S3 |
| | (0, 0, 0, 0, 0, 1, 1, 0, 0, 1, 1, 1, 1) | S0 | S0 | S1 | S2 | S9 | S6 | S8 | S2 |
| $S2_{k-7} \to S0_k$ | (0, 0, 1, 1, 1, 0, 0, 1, 1, 0, 0, 0, 0) | S2 | S3 | S5 | S6 | S8 | S2 | S9 | S6 |
| | (0, 0, 1, 1, 0, 0, 1, 1, 0, 0, 0, 0, 0) | S2 | S9 | S6 | S8 | S2 | S9 | S6 | S7 |
| $S2_{k-7} \to S1_k$ | (0, 0, 1, 1, 1, 0, 0, 1, 1, 0, 0, 0, 1) | S2 | S3 | S5 | S6 | S8 | S2 | S9 | S6 |
| | (0, 0, 1, 1, 0, 0, 1, 1, 0, 0, 0, 0, 1) | S2 | S9 | S6 | S8 | S2 | S9 | S6 | S7 |
| $S2_{k-7} \to S2_k$ | (0, 0, 1, 1, 1, 0, 0, 1, 1, 0, 0, 1, 1) | S2 | S3 | S5 | S6 | S8 | S2 | S9 | S6 |
| | (0, 0, 1, 1, 0, 0, 1, 1, 0, 0, 0, 1, 1) | S2 | S9 | S6 | S8 | S2 | S9 | S6 | S7 |
| $S3_{k-5} \to S0_k$ | (0, 1, 1, 1, 1, 0, 0, 1, 1, 0, 0, 0, 0) | S3 | S4 | S5 | S6 | S8 | S2 | S9 | S6 |
| | (0, 1, 1, 1, 0, 0, 1, 1, 0, 0, 0, 0, 0) | S3 | S5 | S6 | S8 | S2 | S9 | S6 | S7 |
| $S3_{k-5} \to S1_k$ | (0, 1, 1, 1, 1, 0, 0, 1, 1, 0, 0, 0, 1) | S3 | S4 | S5 | S6 | S8 | S2 | S9 | S6 |
| | (0, 1, 1, 1, 0, 0, 1, 1, 0, 0, 0, 0, 1) | S3 | S5 | S6 | S8 | S2 | S9 | S6 | S7 |
| $S3_{k-5} \to S2_k$ | (0, 1, 1, 1, 1, 0, 0, 1, 1, 0, 0, 1, 1) | S3 | S4 | S5 | S6 | S8 | S2 | S9 | S6 |
| | (0, 1, 1, 1, 0, 0, 1, 1, 0, 0, 0, 1, 1) | S3 | S5 | S6 | S8 | S2 | S9 | S6 | S7 |
| $S3_{k-5} \to S2_k$ | (1, 0, 0, 0, 1, 1, 0, 0, 1, 1, 1, 0, 0) | S7 | S1 | S2 | S9 | S6 | S8 | S2 | S3 |
| | (1, 0, 0, 0, 0, 1, 1, 0, 0, 1, 1, 0, 0) | S7 | S0 | S1 | S2 | S9 | S6 | S8 | S2 |
| $S3_{k-5} \to S2_k$ | (1, 0, 0, 0, 1, 1, 0, 0, 1, 1, 1, 1, 0) | S7 | S1 | S2 | S9 | S6 | S8 | S2 | S3 |
| | (1, 0, 0, 0, 0, 1, 1, 0, 0, 1, 1, 1, 0) | S7 | S0 | S1 | S2 | S9 | S6 | S8 | S2 |
| $S3_{k-5} \to S2_k$ | (1, 0, 0, 0, 1, 1, 0, 0, 1, 1, 1, 1, 1) | S7 | S1 | S2 | S9 | S6 | S8 | S2 | S3 |
| | (1, 0, 0, 0, 0, 1, 1, 0, 0, 1, 1, 1, 1) | S7 | S0 | S1 | S2 | S9 | S6 | S8 | S2 |
| $S6_{k-5} \to S6_k$ | (1, 1, 0, 0, 1, 1, 0, 0, 1, 1, 1, 0, 0) | S6 | S8 | S2 | S9 | S6 | S8 | S2 | S3 |
| | (1, 1, 0, 0, 0, 1, 1, 0, 0, 1, 1, 0, 0) | S6 | S7 | S1 | S2 | S9 | S6 | S8 | S2 |
| $S6_{k-5} \to S5_k$ | (1, 1, 0, 0, 1, 1, 0, 0, 1, 1, 1, 1, 0) | S6 | S8 | S2 | S9 | S6 | S8 | S2 | S3 |
| | (1, 1, 0, 0, 0, 1, 1, 0, 0, 1, 1, 1, 0) | S6 | S7 | S1 | S2 | S9 | S6 | S8 | S2 |
| $S6_{k-5} \to S4_k$ | (1, 1, 0, 0, 1, 1, 0, 0, 1, 1, 1, 1, 1) | S6 | S8 | S2 | S9 | S6 | S8 | S2 | S3 |
| | (1, 1, 0, 0, 0, 1, 1, 0, 0, 1, 1, 1, 1) | S6 | S7 | S1 | S2 | S9 | S6 | S8 | S2 |
| $S4_{k-5} \to S0_k$ | (1, 1, 1, 1, 1, 0, 0, 1, 1, 0, 0, 0, 0) | S4 | S4 | S5 | S6 | S8 | S2 | S9 | S6 |
| | (1, 1, 1, 1, 0, 0, 1, 1, 0, 0, 0, 0, 0) | S4 | S5 | S6 | S8 | S2 | S9 | S6 | S7 |
| $S4_{k-5} \to S1_k$ | (1, 1, 1, 1, 1, 0, 0, 1, 1, 0, 0, 0, 1) | S4 | S4 | S5 | S6 | S8 | S2 | S9 | S6 |
| | (1, 1, 1, 1, 0, 0, 1, 1, 0, 0, 0, 0, 1) | S4 | S5 | S6 | S8 | S2 | S9 | S6 | S7 |
| $S4_{k-5} \to S2_k$ | (1, 1, 1, 1, 1, 0, 0, 1, 1, 0, 0, 1, 1) | S4 | S4 | S5 | S6 | S8 | S2 | S9 | S6 |
| | (1, 1, 1, 1, 0, 0, 1, 1, 0, 0, 0, 1, 1) | S4 | S5 | S6 | S8 | S2 | S9 | S6 | S7 |

| STATE TRANSITION | k − 1 | k | | | | | | | | | PR EQUALIZATION IDEAL VALUE | | | | | | EUCLIDEAN DISTANCE BETWEEN PATHS |
|---|---|---|---|---|---|---|---|---|---|---|---|---|---|---|---|---|---|
| $S0_{k-9} \to S6_k$ | S5 | S6 | 1 | 3 | 4 | 4 | 4 | 4 | 5 | 6 | 5 | | | | | | |
| | S9 | S6 | 0 | 1 | 3 | 4 | 4 | 4 | 4 | 4 | 4 | | | | | | 12 |
| $S0_{k-9} \to S5_k$ | S4 | S5 | 1 | 3 | 4 | 4 | 4 | 4 | 5 | 7 | 7 | | | | | | |
| | S3 | S5 | 0 | 1 | 3 | 4 | 4 | 4 | 4 | 5 | 6 | | | | | | 12 |
| $S0_{k-9} \to S4_k$ | S4 | S4 | 1 | 3 | 4 | 4 | 4 | 4 | 5 | 7 | 8 | | | | | | |
| | S3 | S4 | 0 | 1 | 3 | 4 | 4 | 4 | 4 | 5 | 7 | | | | | | 12 |
| $S2_{k-7} \to S0_k$ | S7 | S0 | 5 | 6 | 5 | 4 | 4 | 4 | 4 | 3 | 1 | | | | | | |
| | S0 | S0 | 4 | 4 | 4 | 4 | 4 | 4 | 3 | 1 | 0 | | | | | | 12 |
| $S2_{k-7} \to S1_k$ | S7 | S1 | 5 | 6 | 5 | 4 | 4 | 4 | 4 | 3 | 2 | | | | | | |
| | S0 | S1 | 4 | 4 | 4 | 4 | 4 | 4 | 3 | 1 | 1 | | | | | | 12 |
| $S2_{k-7} \to S2_k$ | S8 | S2 | 5 | 6 | 5 | 4 | 4 | 4 | 4 | 4 | 4 | | | | | | |
| | S1 | S2 | 4 | 4 | 4 | 4 | 4 | 4 | 3 | 2 | 3 | | | | | | 12 |
| $S3_{k-5} \to S0_k$ | S7 | S0 | 7 | 7 | 5 | 4 | 4 | 4 | 4 | 3 | 1 | | | | | | |
| | S0 | S0 | 6 | 5 | 4 | 4 | 4 | 4 | 3 | 1 | 0 | | | | | | 12 |
| $S3_{k-5} \to S1_k$ | S7 | S1 | 7 | 7 | 5 | 4 | 4 | 4 | 4 | 3 | 2 | | | | | | |
| | S0 | S1 | 6 | 5 | 4 | 4 | 4 | 4 | 3 | 1 | 1 | | | | | | 12 |
| $S3_{k-5} \to S2_k$ | S8 | S2 | 7 | 7 | 5 | 4 | 4 | 4 | 4 | 4 | 4 | | | | | | |
| | S1 | S2 | 6 | 5 | 4 | 4 | 4 | 4 | 3 | 2 | 3 | | | | | | 12 |
| $S3_{k-5} \to S2_k$ | S5 | S6 | 2 | 3 | 4 | 4 | 4 | 4 | 5 | 6 | 5 | | | | | | |
| | S9 | S6 | 1 | 1 | 3 | 4 | 4 | 4 | 4 | 4 | 4 | | | | | | 12 |
| $S3_{k-5} \to S2_k$ | S4 | S5 | 2 | 3 | 4 | 4 | 4 | 4 | 5 | 7 | 7 | | | | | | |
| | S3 | S5 | 1 | 1 | 3 | 4 | 4 | 4 | 4 | 5 | 6 | | | | | | 12 |
| $S3_{k-5} \to S2_k$ | S4 | S4 | 2 | 3 | 4 | 4 | 4 | 4 | 5 | 7 | 8 | | | | | | |
| | S3 | S4 | 1 | 1 | 3 | 4 | 4 | 4 | 4 | 5 | 7 | | | | | | 12 |
| $S6_{k-5} \to S6_k$ | S5 | S6 | 4 | 4 | 4 | 4 | 4 | 4 | 5 | 6 | 5 | | | | | | |
| | S9 | S6 | 3 | 2 | 3 | 4 | 4 | 4 | 4 | 4 | 4 | | | | | | 12 |
| $S6_{k-5} \to S5_k$ | S4 | S5 | 4 | 4 | 4 | 4 | 4 | 4 | 5 | 7 | 7 | | | | | | |
| | S3 | S5 | 3 | 2 | 3 | 4 | 4 | 4 | 4 | 5 | 6 | | | | | | 12 |
| $S6_{k-5} \to S4_k$ | S4 | S4 | 4 | 4 | 4 | 4 | 4 | 4 | 5 | 7 | 8 | | | | | | |
| | S3 | S4 | 3 | 2 | 3 | 4 | 4 | 4 | 4 | 5 | 7 | | | | | | 12 |
| $S4_{k-5} \to S0_k$ | S7 | S0 | 8 | 7 | 5 | 4 | 4 | 4 | 4 | 3 | 1 | | | | | | |
| | S0 | S0 | 7 | 5 | 4 | 4 | 4 | 4 | 3 | 1 | 0 | | | | | | 12 |
| $S4_{k-5} \to S1_k$ | S7 | S1 | 8 | 7 | 5 | 4 | 4 | 4 | 4 | 3 | 2 | | | | | | |
| | S0 | S1 | 7 | 5 | 4 | 4 | 4 | 4 | 3 | 1 | 1 | | | | | | 12 |
| $S4_{k-5} \to S2_k$ | S8 | S2 | 8 | 7 | 5 | 4 | 4 | 4 | 4 | 4 | 4 | | | | | | |
| | S1 | S2 | 7 | 5 | 4 | 4 | 4 | 4 | 3 | 2 | 3 | | | | | | 12 |

Set forth in each table above are state transitions indicating a trace from a start state to a merged state, two recording sequences that are likely when the state undergoes the specified transitions, two ideal reproduced waveforms that are likely when the state undergoes the specified transitions, and a Euclidean distance between two ideal reproduced waveforms.

The Euclidean distance indicates a sum of squares of a difference between two ideal reproduced waveforms. When the likelihood of two reproduced waveforms is determined, one is distinguished from the other more readily when the value of the Euclidean distance is large and a possibility of erroneous determination is reduced. Meanwhile, when the value of the Euclidean distance is small, it becomes difficult to distinguish between two likely waveforms and a possibility of erroneous determination becomes higher. In other words, a state transition pattern having a large Euclidean distance can be said as a less error-prone state transition pattern and a state transition pattern having a small Euclidean distance can be said as an error-prone state transition pattern.

Table 1 above shows state transition patterns that can take two state transitions and it shows state transition patterns in a case where a Euclidean distance is 14. There are 18 state transition patterns in a case where a Euclidean distance is 14. The state transition patterns set forth in Table 1 above correspond to edge (switching between a mark and a space) portions of a waveform of an optical disc. In other words, the state transition patterns set forth in Table 1 are patterns of 1-bit shift error of the edge.

By way of example, transition paths in a case where the state S0 (k−5) transitions to the state S6 (k) according to the state transition rule shown in FIG. 2 will be described.

Herein, one transition path is a case where the recording sequence that has transitioned to "0, 0, 0, 0, 1, 1, 1, 0, 0" is detected. Assume that a "0" in the reproduced data is a space portion and "1" is a mark portion and this transition path is in a recording state. Then, the recording state is a combination of a space of a length of 4 T space of more, a 3 T mark, and a space of a length of 2 T space of more. The relation between the sample time and the reproduction level (signal level) in this transition path is shown in FIG. 3 as a path A waveform.

Figure 3:
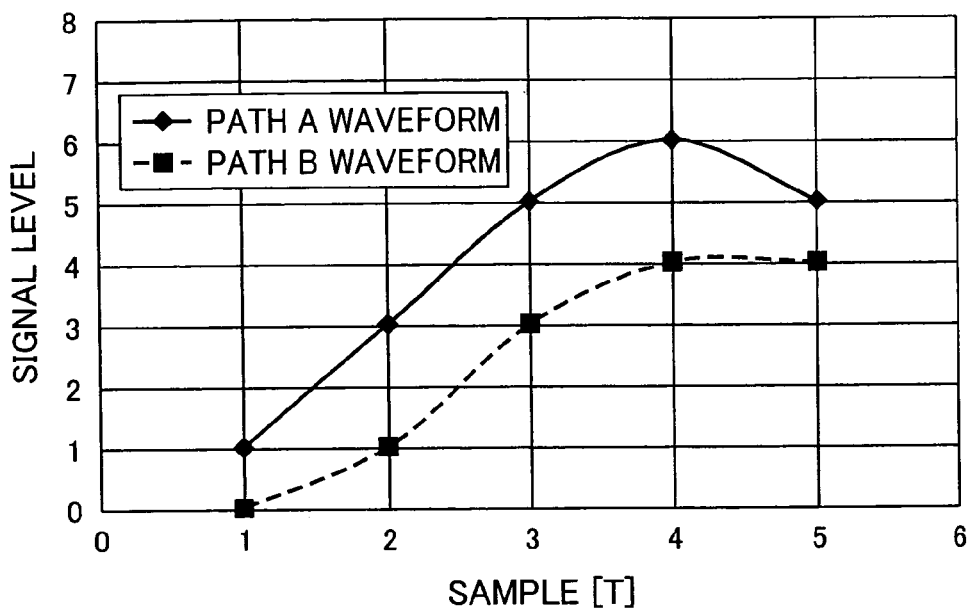
FIG. 3 is a view showing the relation between a sample time and a reproduction level (signal level) in transition paths set forth in Table 1 below.
Figure 4:
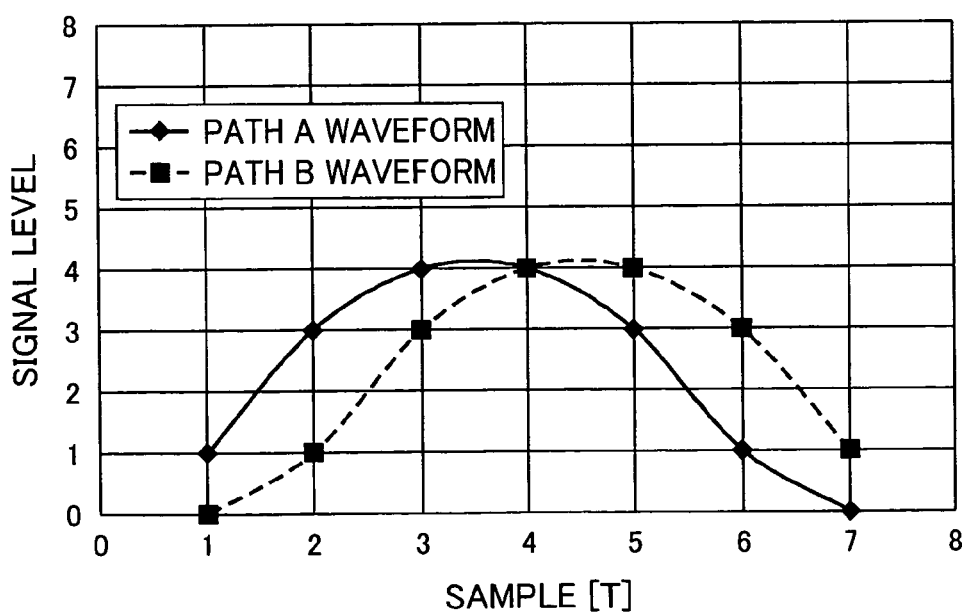
FIG. 4 is a view showing the relation between the sample time and the reproduction level (signal level) in transition paths set forth in Table 2 below.
Figure 5:
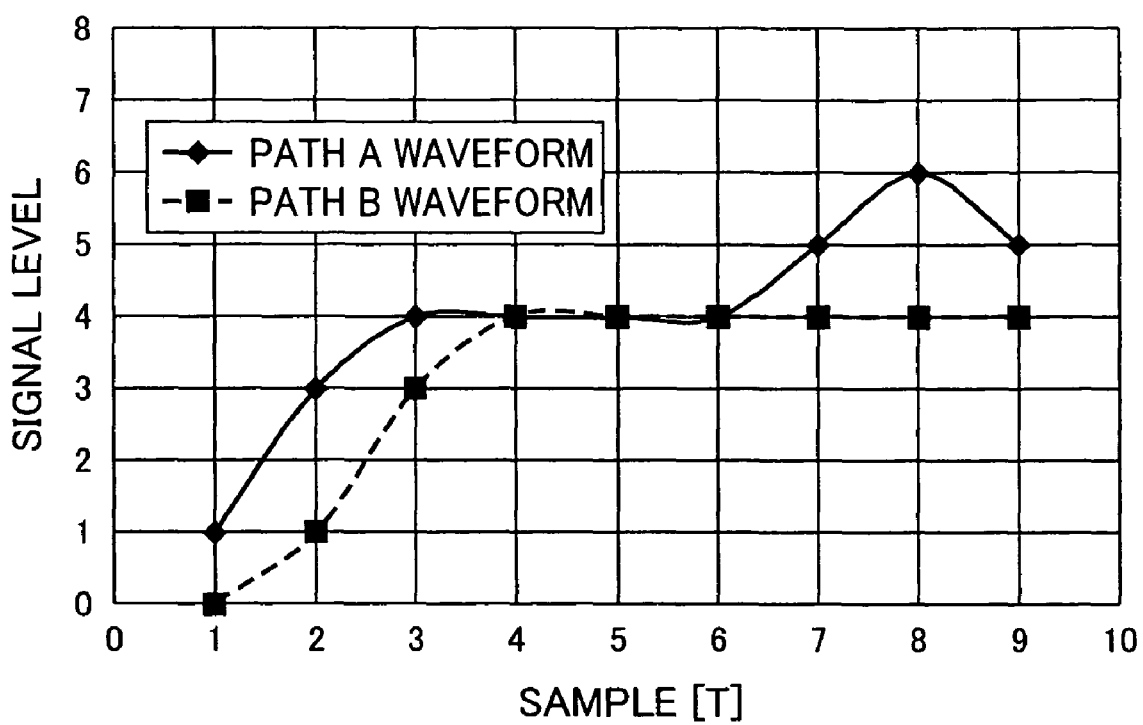
FIG. 5 is a view showing the relation between the sample time and the reproduction level (signal level) in transition paths set forth in Table 3 below.

FIG. 3 is a view showing the relation between the sample time and the reproduction level (signal level) in the transition paths set forth in Table 1 above. In FIG. 3 through FIG. 5, the abscissa is used for the sample time per clock time of the recording sequence and the ordinate is used for the reproduction level. Although it has been described above, in the case of PR 12221 ML, the ideal reproduction levels are nine levels from a level 0 to a level 8.

The other transition path is a case where the recording sequence that has transitioned to "0, 0, 0, 0, 0, 1, 1, 0, 0" is detected. Assume that "0" in the reproduced data is a space portion and "1" is a mark portion and this transition path is in a recording state. Then, the recording state is a combination of a space of a length of 5 T space of more, a 2 T mark, and a space of a length of 2 T space or more. The relation between the sample time and the reproduction level (signal level) in this transition path is shown in FIG. 3 as a path B waveform. The state transition patterns with a Euclidean distance of 14 set forth in table 1 above are characterized in that they are patterns each necessarily containing one piece of edge information (zero cross point).

Table 2 above shows state transition patterns that can take two state transitions as those in Table 1 above and it shows state transition patterns in a case where a Euclidean distance is 12. There are 18 state transition patterns in a case where a Euclidean distance is 12. The state transition patterns set forth in Table 2 above are shift errors of a 2 T mark or a 2 T space and they are patterns of a 2-bit shift error.

By way of example, transition paths in a case where the state S0 (k−7) transitions to the state S0 (k) according to the state transition rule shown in FIG. 2 will be described. It should be noted, however, that FIG. 2 only shows states up to the time k−5. Herein, one transition path is a case where the recording sequence that has transitioned to "0, 0, 0, 0, 1, 1, 0, 0, 0, 0" is detected. Assume that "0" in the reproduced data is a space portion and "1" is a mark portion and this transition path is in a recording state. Then, the recording state is a combination of a space of a length of 4 T space of more, a 2 T mark, and a space of a length of 5 T space of more. The relation between the sample time and the reproduction level (signal level) in this transition path is shown in FIG. 4 as a path A waveform. FIG. 4 is a view showing the relation between the sample time and the reproduction level (signal level) in the transition paths set forth in Table 2 above.

The other transition path is a case where the recording sequence that has transitioned to "0, 0, 0, 0, 0, 1, 1, 0, 0, 0, 0" is detected. Assume that "0" in the reproduced data is a space portion and "1" is a mark portion and this transition path is in a recording state. Then, the recording state is a combination of a space of a length of 5 T space of more, a 2 T mark, and a space of a length of 4 T space of more. The relation between the sample time and the reproduction level (signal level) in this transition path is shown in FIG. 4 as a path B waveform. The state transition patterns with a Euclidean distance of 12 set forth in Table 2 above are characterized in that they are patterns each necessarily containing two pieces of edge information about the rising and the falling of 2 T.

Table 3 above shows state transition patterns that can take two state transitions as those in Table 1 and Table 2 above and it shows the state transition patterns in a case where a Euclidean distance is 12. There are 18 state transition patterns in a case where a Euclidean distance is 12. The state transition patterns set forth in Table 3 above are points at which a 2 T mark and a 2 T space are continuous and they are patterns of a 3-bit shift error.

By way of example, transition paths in a case where the state S0 (k−9) transitions to the state S6 (k) according to the state transition rule shown in FIG. 2 will be described. It should be noted, however, that FIG. 2 only shows the states up to the time k−5. Herein, one transition path is a case where the recording sequence that has transitioned to "0, 0, 0, 0, 1, 1, 0, 0, 1, 1, 1, 0, 0" is detected. Assume that "0" in the reproduced data is a space portion and "1" is a mark portion and this transition path is in a recording state. Then, the recording state is a combination a space of a length of a 4 T space of more, a 2 T mark, a 2 T space, a 3 T mark, and a space of a length of a 2 T space of more. The relation between the sample time and the reproduction level (signal level) in this transition path is shown in FIG. 5 as a path A waveform. FIG. 5 is a view showing the relation between the sample time and the reproduction level (signal level) in the transition paths set forth in Table 3 above.

The other transition path is a case where the recording sequence that has transitioned to "0, 0, 0, 0, 0, 1, 1, 0, 0, 1, 1, 0, 0" is detected. Assume that "0" in the reproduced data is a space portion and "1" is a mark portion and this transition path is in a recording state. Then, the recording state is a combination of a space of a length of a 5 T space of more, a 2 T mark, a 2 T space, a 2 T mark, and a space of a length of a 2 T space of more. The relation between the sample time and the reproduction level (signal level) in this transition path is shown in FIG. 5 as a path B waveform. The state transition patterns with a Euclidean distance of 12 set forth in Table 3 above are characterized in that they are patterns each containing at least three pieces of edge information.

In a case where a synchronous signal of a reproduced signal is generated using the displacement information of the leading edge or the trailing edge of a mark of a signal to be reproduced, it is necessary that the phase displacement direction can be detected separately at the leading edge portion and the trailing edge portion of each mark length. In a case where PR 12221 ML is used, it becomes possible to detect a phase error for synchronization with a reproduced signal using state transition patterns with a Euclidean distance of 14 described with reference to Table 1 above.

First Embodiment

Figure 6:
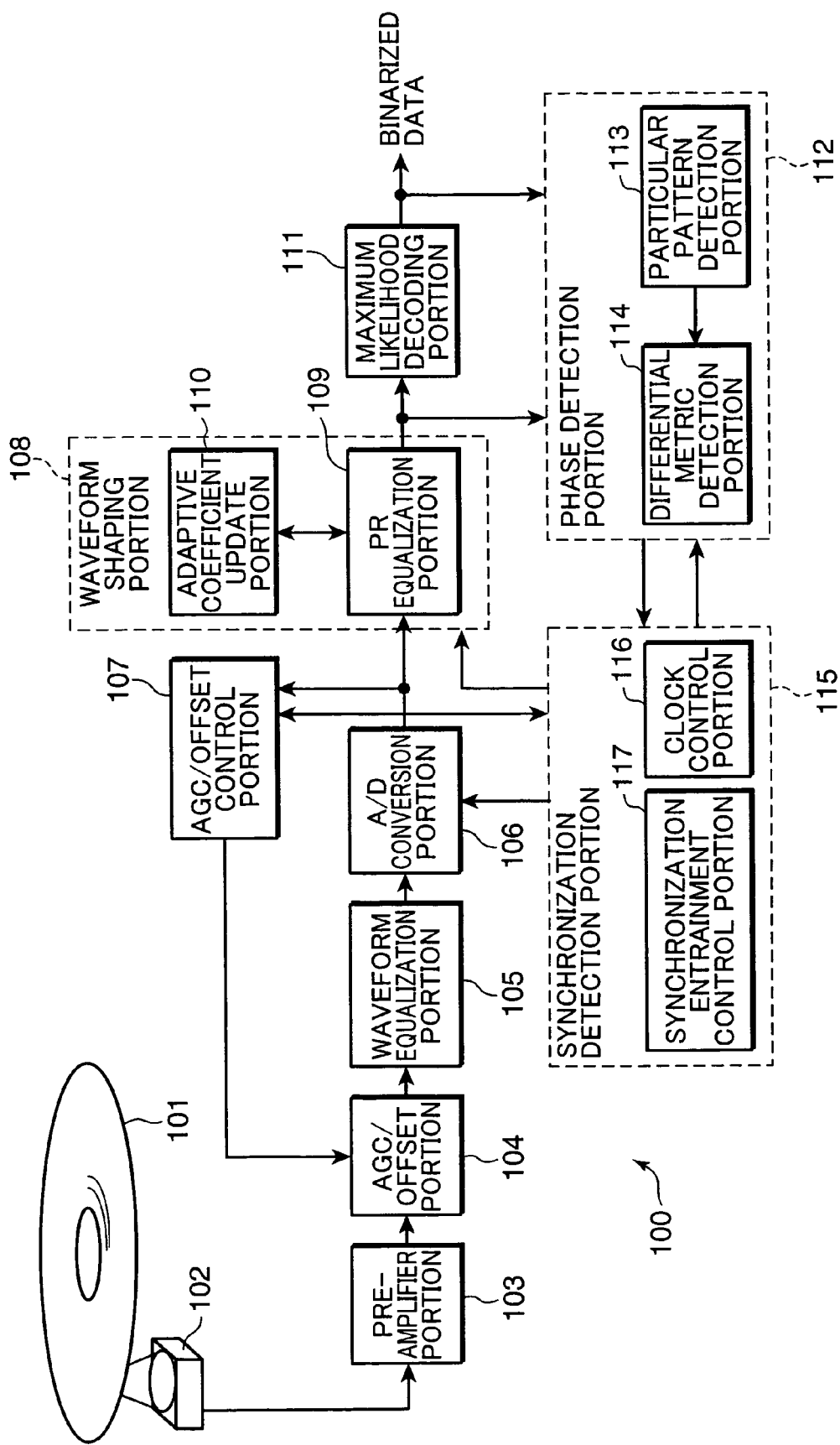
FIG. 6 is a block diagram showing the configuration of an optical disc device according to a first embodiment of the invention.

Initially, an optical disc device according to a first embodiment of the invention will be described. FIG. 6 is a block diagram showing the configuration of the optical disc device according to the first embodiment of the invention.

An information recording medium 101 is an information recording medium in and from which information is optically recorded and reproduced, and it is, for example, an optical disc.

The optical disc device 100 shown in FIG. 6 includes an optical head portion 102, a pre-amplifier portion 103, an AGC (Automatic Gain Controller)/OFFSET portion 104, a waveform equalization portion 105, an A/D conversion portion 106, an AGC/OFFSET control portion 107, a waveform shaping portion 108, a maximum likelihood decoding portion 111, a phase detection portion 112, and a synchronization detection portion 115. Further, the waveform shaping portion 108 includes a PR (Partial Response) equalization portion 109 and an adaptive coefficient update portion 110. The phase detection portion 112 includes a particular pattern detection portion 113 and a differential metric detection portion 114. The synchronization detection portion 115 includes a clock control portion 116 and a synchronization entrainment control portion 117.

The optical head portion 102 generates an analog reproduced signal expressing information read out from the information recording medium 101. The pre-amplifier portion 103 amplifies the analog reproduced signal generated in the optical head portion 102 by a predetermined gain and outputs the resulting signal to the AGC/OFFSET portion 104.

The AGC/OFFSET portion 104 amplifies or attenuates the analog reproduced signal from the pre-amplifier portion 103 according to a control signal from the AGC/OFFSET control portion 107 so that the analog reproduced signal has a predetermined amplitude and outputs the resulting signal to the waveform equalization portion 105.

The waveform equalization portion 105 has a filter characteristic to amplify a high frequency of the analog reproduced signal and thereby amplifies a high frequency portion of the reproduced waveform. It then outputs the result to the A/D conversion portion 106.

The AGC/OFFSET control portion 107 outputs a control signal to the AGC/OFFSET portion 104 so that the level of a digital reproduced signal outputted from the A/D conversion portion 106 reaches a pre-set target level.

The A/D conversion portion 106 converts an analog reproduced signal to a digital reproduced signal by sampling the analog reproduced signal in synchronization with a reproduction clock outputted from the synchronization detection portion 115 and outputs the result to the waveform shaping portion 108.

The waveform shaping portion 108 receives a digital reproduced signal generated from an analog reproduced signal reproduced from the information recording medium 111 and shapes the waveform of the digital reproduced signal.

The PR equalization portion 109 is furnished with a capability of making the filter characteristic variable to the characteristics of various types of PR. The PR equalization portion 109 applies filtering in order to achieve the frequency characteristic set so that the frequency characteristic of the recoding and reproducing system will be the characteristic assumed by the maximum likelihood decoding portion 111 (for example, PR (1, 2, 2, 2, 1) equalization characteristic). It then applies PR equalization, which is a process to suppress high-frequency noises and intentionally append intersymbol interference, to a digital reproduced signal and outputs the resulting signal to the maximum likelihood decoding portion 111. The PR equalization portion 109 is formed, for example, of an FIR (Finite Impulse Response) filter.

The adaptive coefficient update portion 110 changes and updates coefficients of the FIR filter in the PR equalization portion 109 according to the characteristic of a reproduced signal inputted therein so that an output of the PR equalization portion 109 will have a desired PR characteristic.

The maximum likelihood decoding portion 111 applies maximum likelihood decoding to the digital reproduced signal in the waveform shaped by the waveform shaping portion 108 and thereby generates a binarized signal that indicates the result of the maximum likelihood decoding. The maximum likelihood decoding portion 111 is, for example, a Viterbi decoder. It uses the maximum likelihood decoding method by which a most likely sequence is predicted according to the coding rule appended intentionally in response to the type of the partial response (PR) characteristic to decode the reproduced signal subjected to PR equalization in the PR equalization portion 109, and thereby outputs binarized data. The binarized data outputted from the maximum likelihood decoding portion 111 is outputted to a circuit (not shown) in the latter stage as a decoded binarized signal. A predetermined process is applied to this data and information recorded in the information recording medium 101 is reproduced.

The phase detection portion 112 detects a phase error on the basis the digital reproduced signal in the waveform shaped by the waveform shaping portion 108 and the binarized signal generated by the maximum likelihood decoding portion 111. Also, the phase detection portion 112 extracts, during the maximum likelihood decoding, a phase error using state transition patterns having only a single zero cross point among differential metrics at a plurality of merging points at which a set of paths branched from a given state will merge.

The particular pattern detection portion 113 in the phase detection portion 112 detects particular state transition patterns from the binarized data outputted from the maximum likelihood decoding portion 111. As a concrete example, it detects state transition patterns of 36 recording coding sequences (bk−i, . . . , and bk) set forth in Table 1 above. It is configured in such a manner that the particular state transition patterns to be detected can be adaptively selected. The particular pattern detection portion 113 is configured in such a manner that it is able to select state transition patterns used to calculate a phase error in response to circumstances in the synchronization detection portion 115, such as during frequency entrainment, during phase entrainment, and at the occurrence of deterioration in reproduction quality.

The differential metric detection portion 114 in the phase detection portion 112 calculates differential metrics only in the patterns detected by the particular pattern detection portion 113 and further converts the differential metrics thus calculated into phase error information.

The synchronization detection portion 115 generates a reproduction clock signal using the phase error detected by the phase detection portion 112 and brings the digital reproduced signal into synchronization with the reproduction clock signal thus generated.

The clock control portion 116 in the synchronization detection portion 115 converts an output of the phase detection portion 112 into the frequency of the reproduction clock by allowing the phase error information inputted therein from the phase detection portion 112 to pass through a predetermined filter and outputs the converted reproduction clock to the A/D conversion portion 106. The clock control portion 116 may use a VCO (Voltage Control Oscillator) in order to convert a phase error into the frequency of the reproduction clock.

The synchronization entrainment control portion 117 in the synchronization detection portion 115 outputs signals that control respective blocks during synchronization entrainment. The synchronization entrainment control portion 117 controls operations of the AGC/OFFSET control portion 107, the adaptive coefficient update portion 110, and the phase detection portion 112.

Figure 7:
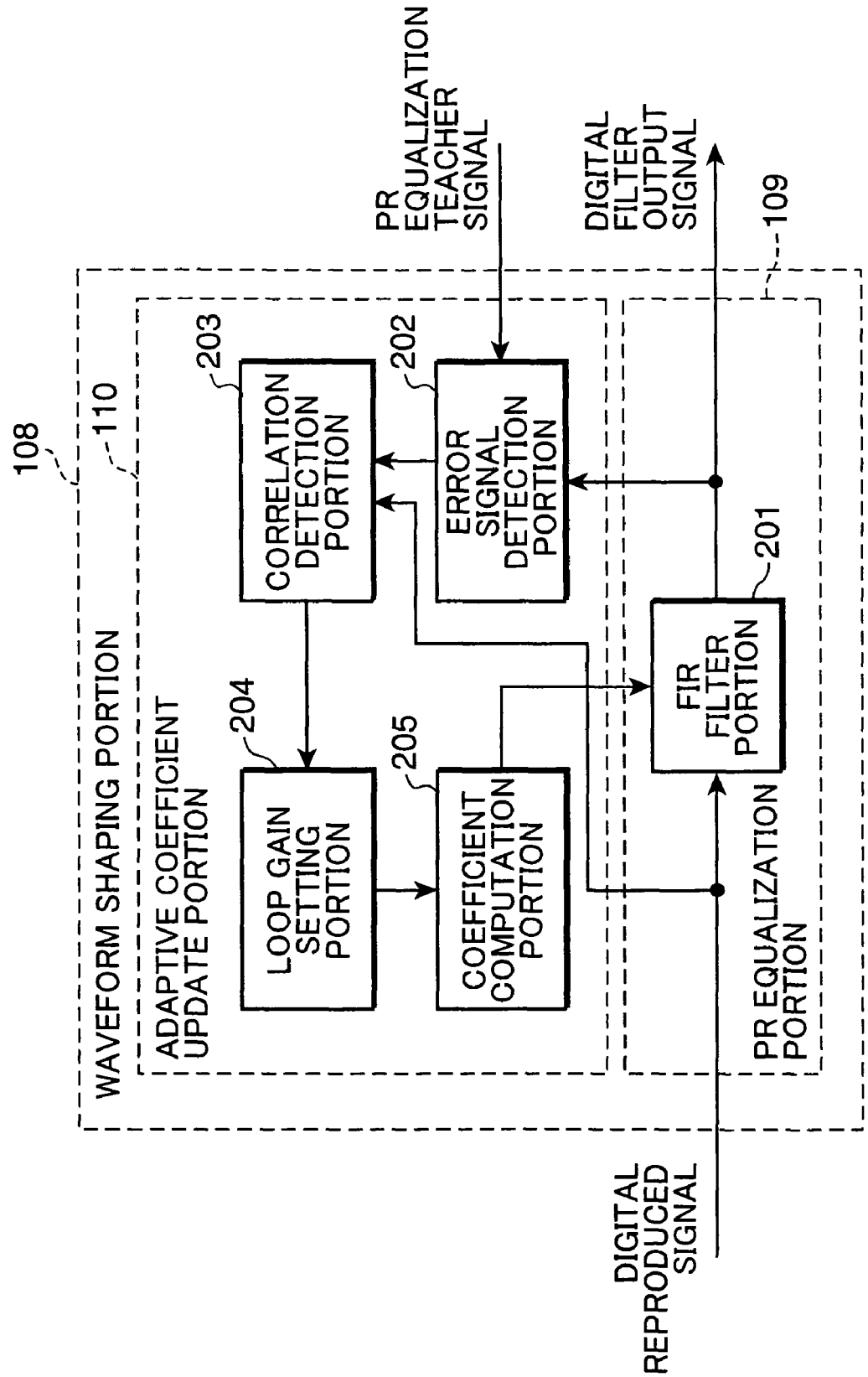
FIG. 7 is a block diagram showing the configuration of a waveform shaping portion that uses an LMS algorithm.

The detailed configuration of the waveform shaping portion 108 shown in FIG. 6 will now be described. FIG. 7 is a block diagram showing the configuration of a waveform shaping portion that uses an LMS algorithm. The first embodiment is configured to update filter coefficients using the LMS (Least Mean Square) algorithm. The setup equation of equalization coefficients in the LMS algorithm is expressed as Equation (1) below. The LMS algorithm is disclosed in JP-A-2003-85764.

$$w(n(T+1)) = w(nT) + A \cdot e(nT) \cdot x(nT) \qquad (1)$$

where T=0, 1, 2, 3, and so on.

Herein, w(nT) is a current coefficient, w(n(T+1)) is an updated coefficient, A is a tap gain, e(nT) is an equalization error, x(nT) is an FIR filter input signal. Also, n is a parameter to select an update cycle of the coefficient. In accordance with Equation (1) above, the equalization coefficients of the FIR (Finite Impulse Response) filter are updated.

In this embodiment, the filter coefficients are updated using the LMS algorithm. It should be appreciated, however, that the algorithm is not particularly limited to an update control algorithm of the filter coefficients and other algorithms may be used as well.

The PR equalization portion 109 includes the FIR filter portion 201. The adaptive coefficient update portion 110 includes an error signal detection portion 202, a correlation detection portion 203, a loop gain setting portion 204, and a coefficient computation portion 205. Into the waveform shaping portion 108 are inputted a digital reproduced signal outputted from the A/D conversion portion 106 and a PR equalization teacher signal outputted from an unillustrated predetermined circuit. From the waveform shaping portion 108 is outputted a digital filter signal after desired filter processing is applied thereon through various operations according to a control signal from the synchronization entrainment control portion 117.

The error signal detection portion 202 calculates the equalization error (e(nT)) in Equation (1) above. The error signal detection portion 202 outputs a difference between the PR equalization teacher signal and an output of the FIR filter portion 201 (digital filter output signal) inputted therein as an error signal. The correlation detection portion 203 calculates a product value (e (nT)·x(nT)) of the equalization error in Equation (1) above and a digital reproduced signal. The loop gain setting portion 204 sets a loop gain of a coefficient update loop in the FIR filter portion 201 by multiplying an output of the correlation detection portion 203 by the tap gain (A) in Equation (1) above.

The coefficient computation portion 205 updates coefficients of the filter on the basis of an error signal from the loop gain setting portion 204 and outputs the updated coefficients to the FIR filter portion 201. The coefficient computation portion 205 calculates each updated filter coefficient (w(n(T+1))) by adding the current filter coefficient (w(nT)) to an output of the loop gain setting portion 204.

The adaptive coefficient update portion 110 of this embodiment is formed within a PLL (Phase Locked Loop) loop for synchronization with a reproduced signal and therefore has two points as follows.

A first point is a coefficient update control method. The coefficient computation portion 205 can have a capability of individually controlling as many coefficients as tap coefficients (tap gains) provided to the FIR filter portion 201, but it is characterized in that it controls the coefficients to be right-left symmetrical. The coefficient control under the restriction of right-left symmetry referred to herein means the control under which the gain at a predetermined frequency alone can be changed without having to change the phase relation between a digital reproduced signal inputted into the FIR filter portion 201 and a digital filter output signal outputted from the FIR filter portion 201.

Because the waveform shaping portion 108 is disposed within the PLL loop, this control is performed with the purpose not to correct the phase in the FIR filter portion 201 so that a phase error can be detected appropriately in the phase detection portion 112 in the latter stage of the FIR filter portion 201. As an example of the coefficient control that makes the tap coefficients right-left symmetrical, there is a method by which an average of the tap coefficients in the right and left is calculated after a plurality of tap coefficients in the FIR filter portion 201 are calculated and the result of calculation is used in the FIR filter portion 201 as the tap coefficients. It should be appreciated, however, that this embodiment is not limited to this example of the coefficient control. The coefficient control to make the tap coefficients right-left symmetrical may be performed using other calculation methods.

A second point is a detection method of an equalization error found in the error signal detection portion 202. Regarding the detection of an equalization error, it is general that an output of the FIR filter portion 201 is converted into a binary form by a predetermined method to generate an ideal waveform from the resulting binarized signal and a difference between the ideal waveform and an output waveform of the FIR filter portion 201 is detected as an equalization error. On the contrary, this embodiment is characterized in that an equalization error is not detected from a signal waveform relating to 2 T or 3 T and from a signal waveform having an error as large as or larger than a predetermined error.

Initially, regarding the binarization of an output of the FIR filter portion 201, it is possible to enhance the binarization accuracy by decoding the output using the maximum likelihood decoding, such as Viterbi decoding. From the viewpoint that the error signal detection portion 202 performs processing within the PLL loop, it is necessary to provide the configuration that takes latency into account (to provide the configuration in which a delay is suppressed to the minimum). Accordingly, the binarization to generate an ideal waveform is performed using a waveform after the FIR filtering, for example, by the level determination processing. The binarization accuracy cannot be therefore expected. Further, as has been described above, in a case where a region in which information is recorded at a higher recording line density is reproduced, much less is expected for binarization accuracy with the reproduced waveform.

In view of the foregoing, this embodiment makes it possible to stabilize an adaptive equalization loop not by detecting an equalization error from a signal waveform relating to 2 T or 3 T and from a signal waveform having an error as large as or larger than a predetermined error. In a case where an equalization error is not detected from a signal waveform relating to 2 T or 3 T, there may be produced a side-effect that the coefficients cannot be controlled so as to have a predetermined PR characteristic. However, the phase information cannot be extracted, in particular, from a reproduced waveform of a 2 T signal in which the frequency of the shortest mark is in the vicinity of an OTF cutoff frequency or exceeds the OTF cutoff frequency. In addition, although it depends on a recording line density, there is a case where it becomes difficult to extract the phase information from a 3 T signal because the amplitude is extremely small.

Accordingly, by setting a pattern not to extract a phase error in the phase detection portion 112 in the latter stage, there is no need to make the coefficients to have the predetermined PR characteristic at high accuracy for a 2 T signal and a 3 T signal. In addition, because the frequency characteristics expressed by the FIR filter are limited by limiting the number of taps, the coefficients are corrected to some extent. For example, the number of taps may be set to 5 to 13. Hence, it is not that the gain correction of a 2 T signal and a 3 T signal is not taken into account at all.

It should be appreciated that the detection control of an equalization error in this embodiment is not limited to this example of detection control. For example, it may be the detection control under which an equalization error is not detected from the signal waveform relating to a 2 T signal alone.

Further, it is configured in such a manner that a pattern from which to detect a phase error can be selected adaptively in the phase detection portion 112. Hence, this embodiment is not limited to the example described above.

An operation of the optical disc device configured as above will now be described.

As is set forth in Table 4 below, the synchronization entrainment control portion 117 in the synchronization detection portion 115 controls the AGC/OFFSET control portion 107, the adaptive coefficient update portion 110 in the waveform shaping portion 108, and the particular pattern detection portion 113 in the phase detection portion 112.

As examples of the control state, states are classified into states before the tracking control is enabled, before the AGC/OFFSET convergence is enabled, before the frequency entrainment is enabled, before the phase entrainment is enabled, and after the phase entrainment is enabled, each of which will be described in detail below.

A reproduced signal having a predetermined amplitude is obtained from the preamplifier portion 103 by performing the focus control and the tracking control in such a manner that the optical head portion 102 is controlled to move to the information recording medium 101 at a region in which information is recorded and the motor that rotates the information recording medium 101 is controlled to run so that the information recording medium 101 rotates at a predetermined rotation number.

When the tracking control becomes an ON state, the AGC/OFFSET control portion 107 starts the control and outputs a control signal to the AGC/OFFSET portion 104 so that the level of a digital signal outputted from the A/D conversion portion 106 reaches the pre-set target level.

The AGC/OFFSET control portion 107 outputs an AGC/OFFSET portion control enable signal to the synchronization detection portion 115 when the level of a digital reproduced signal outputted from the A/D conversion portion 106 falls within a predetermined range with respect to the target level.

Until the control on the AGC/OFFSET portion 104 is enabled, the synchronization entrainment control portion 117 in the synchronization detection portion 115 outputs control signals to inhibit the control on the adaptive coefficient update portion 110 in the waveform shaping portion 108, the phase detection in the phase detection portion 112, and the frequency control and the phase control in the synchronization detection portion 115.

When the control on the AGC/OFFSET portion 104 is enabled, the synchronization entrainment control portion 117 starts the frequency control first. Herein, detailed descriptions of the frequency control are omitted and an operation thereof will be described briefly. Reference should be made to JP-A-2006-504217 (kohyo) for details.

When the frequency control is started, the adaptive coefficient update portion 110 starts the FIR coefficient control and inputs the waveform after the predetermined PR equalization into the maximum likelihood decoding portion 111. The maximum likelihood decoding portion 111 then converts the signal inputted therein into a binary form. The binarized signal outputted from the maximum likelihood decoding portion 111 is inputted into the phase detection portion 112. The phase detection portion 112 then detects a synchronization

TABLE 4

| CONTROL STATE | AGC/OFFSET CONTROL PORTION 107 | ADAPTIVE COEFFICIENT UPDATE PORTION 110 | PARTICULAR PATTERN DETECTION PORTION 113 |
|---|---|---|---|
| BEFORE TRACKING CONTROL IS ENABLED | OFF | OFF | OFF |
| BEFORE AGC/OFFSET CONVERGENCE IS ENABLED | ON | OFF | OFF |
| BEFORE FREQUENCY ENTRAINMENT IS ENABLED | ON | ON | OFF (DETECT SYNCHRONIZATION MARK) |
| BEFORE PHASE ENTRAINMENT IS ENABLED | ON | ON | TABLE 1 (ALL PATTERNS) |
| AFTER PHASE ENTRAINMENT IS ENABLED | ON | ON | TABLE 1 (DELETE 2T PATTERNS) | mark for detecting a frequency error. Although the synchronization mark is not shown in the drawings, in the case of a BD (Blu-ray disc), the synchronization mark is a 9 T9 T pattern and the data is a combined pattern from 2 T to 8 T.

The phase detection portion 112 detects a continuous pattern length that will be the longest in a period that is several times the interval in which the synchronization mark is inserted and outputs a pattern length error (frequency error) between the pattern length thus detected and the 9 T9 T pattern length to the synchronization detection portion 115. The clock control portion 116 in the synchronization detection portion 115 varies the oscillation frequency of the VCO according to the frequency error inputted therein from the phase detection portion 112. When the frequency error is equal to or smaller the predetermined error, the clock control portion 116 determines that the frequency entrainment is enabled and starts the phase entrainment subsequently.

When the phase entrainment is started, the particular pattern detection portion 113 in the phase detection portion 112 detects a total of 36 state transition patterns set forth in Table 1 above from the binarized sequences inputted therein from the maximum likelihood decoding portion 111. Subsequently, the differential metric detection portion 114 calculates a differential metric error of the state transition patterns detected by the particular pattern detection portion 113, converts the differential metric error thus calculated into phase information, and outputs the phase information to the synchronization detection portion 115. The clock control portion 116 in the synchronization detection portion 115 then varies the oscillation frequency of the VCO according to the phase information (error) inputted therein from the phase detection portion 112. For example, the clock control portion 116 determines that the phase entrainment is enabled (completed) when the synchronization mark is detected a predetermined number of times in succession.

When the phase entrainment is completed, the particular pattern detection portion 113 in the phase detection portion 112 detects the state transition patterns other than a total of 10 state transition patterns relating to the 2 T pattern among a total of 36 state transition patterns set forth in Table 1 above from the binarized sequences inputted therein from the maximum likelihood decoding portion 111. Subsequently, the differential metric detection portion 114 calculates a differential metric error among the detected state transition patterns, converts the differential metric error thus calculated into phase information, and outputs the phase information to the synchronization detection portion 115. The clock control portion 116 in the synchronization detection portion 115 then controls the oscillation frequency of the VCO according to the phase information (error) inputted therein from the phase detection portion 112.

Herein, a total of 10 state transition patterns relating to the 2 T pattern are (0, 0, 0, 0, 0, 1, 1, 0, 0), (0, 0, 1, 1, 0, 0, 0, 0, 0), (0, 0, 1, 1, 0, 0, 0, 0, 1), (0, 0, 1, 1, 0, 0, 0, 1, 1), (0, 1, 1, 1, 1, 0, 0, 1, 1,), (1, 0, 0, 0, 0, 1, 1, 0, 0), (1, 1, 0, 0, 1, 1, 1, 0, 0), (1, 1, 0, 0, 1, 1, 1, 1, 0), (1, 1, 0, 0, 1, 1, 1, 1, 1), and (1, 1, 1, 1, 1, 0, 0, 1, 1) in the recording codes (bk–i, . . . , and bk) set forth in Table 1 above.

In a state before the phase entrainment is completed, the differential metric detection portion 114 detects a phase error using the 36 state transition patterns set forth in Table 1 above. This is because there is a need to increase a gain of the PLL loop as high as possible in order to complete the phase entrainment sooner. Meanwhile, in a state after the phase entrainment is completed, the differential metric detection portion 114 stops detecting a phase error using the state transition patterns relating to the 2 T pattern. The detection is stopped because extraction of the phase information from the 2 T mark is quite difficult at a recording density at which the frequency of the 2 T mark becomes higher than the OTF cutoff frequency, the detection possibly becomes a disturbance on the contrary when the quality is poor. The phase information is absent at each of the leading edge or the trailing edge of the 2 T mark. However, according to the phase error extraction method of this embodiment, it is possible to extract the phase information from the waveform in the amplitude direction obtained from intersymbol interference with space lengths before and behind, and the detection may be useful during the phase entrainment in some cases.

It should be appreciated, however, that this embodiment is not limited to the switching control as described above. In a case where there is a margin of phase entrainment time, the phase error may be extracted always without using state transition patters relating to the 2 T pattern. Alternatively, in a case where it is known beforehand that the recording quality is satisfactory, the phase information may be extracted always from the state transition patterns relating to the 2 T pattern. In addition, the example above described the control as to the ON/OFF switching of a part of the state transition patterns set forth in Table 1 above. However, combinations of other state transition patterns set forth in Table 1 above may be used as well.

In addition, the above described an example of the frequency control using the synchronization pattern contained in the data. However, the frequency control may use a track wobble frequency of a BD-RE/R.

An example of the phase error calculation and a manner to maintain the PLL loop gain constant of this embodiment will now be described.

For the 36 state transition patterns set forth in Table 1 above, concrete waveforms are shown in FIG. 3 and described in the above.

The phase error can be calculated, for example, in accordance with Equation (2):

$$\text{PHASE ERROR} = \frac{\left| \sum_{i=0}^{4} (\text{Path}A_i - S_i)^2 - \sum_{i=0}^{4} (\text{Path}B_i - S_i)^2 \right| - 14}{14 \times 2} \quad (2)$$

In Equation (2) above, the path A and the path B are PR equalization ideal values of five samples of the state transition patterns set forth in Table 1 above, and S is a reproduced waveform of five samples corresponding to the predetermined state transition patterns set forth in Table 3 above. In the case of Table 1 above, because a square distance between ideal two state transition patterns is 14, the detection window is 14×2. A code is appended to each state transition pattern set forth in Table 1 above, that is, to each leading end and each trailing end, so that it is detected as a phase error.

Regarding an amount of the phase error expressed by Equation (2) above, a value corresponding to the quality of a reproduced signal can be calculated by finding scattering (a variance) of the numerator and normalizing the scattering with the detection window. In a case where the reproduction quality is poor, a variance in amount of the phase error detected in accordance with Equation (2) above becomes larger and in a case where the reproduction quality is satisfactory, a variance in amount of the phase error detected in accordance with Equation (2) above becomes smaller. In order to make the PLL loop gain independently of the reproduction quality to the extent possible, by lowering the gain of the LPF (not shown) included in the synchronization portion 115 and passing the phase error in a case where the reproduction quality is poor and by increasing the gain of the LPF (not shown) included in the synchronization portion 115 and passing the phase error in a case where the reproduction quality is satisfactory, the same PLL loop characteristic can be achieved constantly.

In a case where an amount of the phase error is equal to or greater than the predetermined amount expressed by Equation (2) above, the phase detection portion 112 may opt not to output the phase error to the synchronization detection portion 115. More specifically, when the detected phase error is greater than a predetermined threshold value, the phase detection portion 112 does not output the phase error to the synchronization detection portion 115. Accordingly, it is understood that it is highly likely that a phase error equal to or greater than the predetermined error is outputted erroneously. Hence, the PLL can be stabilized by deleting this phase error.

Figure 8:
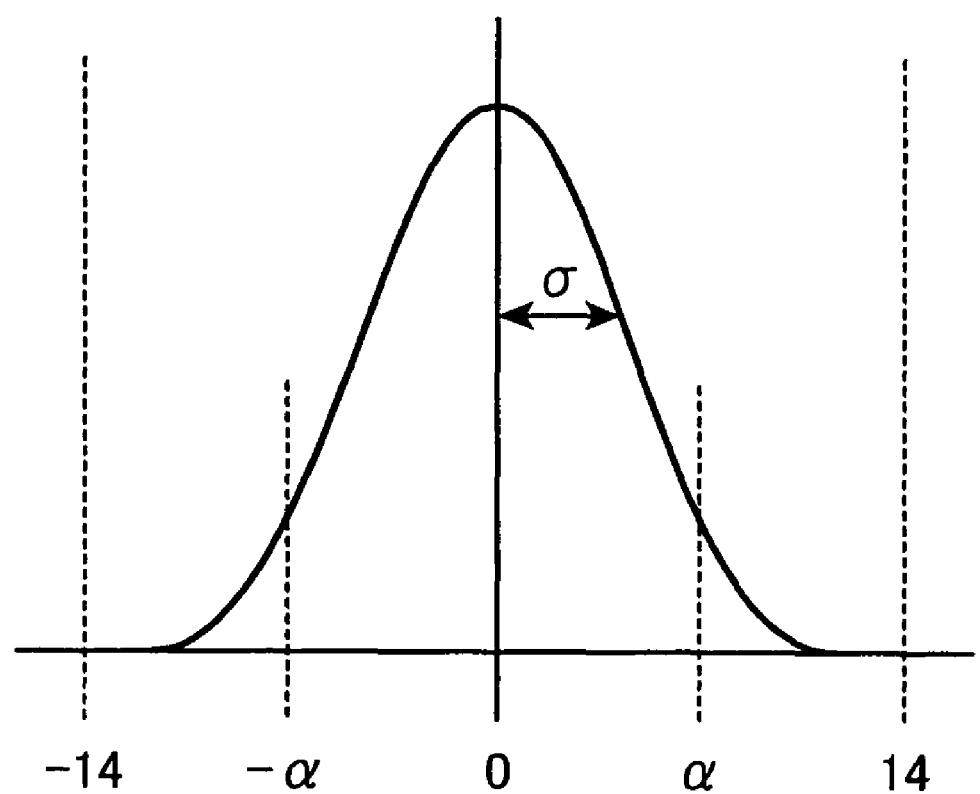
FIG. 8 is a view showing an example of a variance (frequency distribution) of a phase error found in accordance with Equation (2) below.

FIG. 8 is a view showing an example of a variance (frequency distribution) of the phase error found in accordance with Equation (2) above. In the case of the phase detection using the state transition patterns with which the square of a Euclidean distance in Equation (2) above is 14, the detection width is ±14 with 0 at the center. The loop gain of the PLL is changed adequately according to the magnitude of a variance a of this distribution. As the changing method, for example, the loop gain may be changed linearly or in the shape of a quadratic curve according to a change of a variance σ.

A large phase error detected after the PLL lock state can be a disturbance to the PLL loop. It is therefore preferable to set a predetermined threshold value ±α for the phase error, so that the phase error is not outputted when the phase error is greater than the threshold value ±α. An operation not to output the phase error means, for example, an operation to output 0. Because the abscissa of FIG. 8 is used for an amount of the phase error, in a case where the absolute value is greater than the predetermined threshold value ±α, it is preferable not to output the phase error. For example, the predetermined threshold ±α may be ±7, which is half the detection width, ±14.

Alternatively, the loop gain may be changed adaptively so that a part of the detection patterns set forth in Table 1 above are selected according to a variance in amount of the phase error expressed by Equation (2) above so that the selected detection patterns are outputted. For example, in a case where the reproduction quality is satisfactory, the phase detection portion 112 may perform the phase detection using all the statues transition patterns set forth in Table 1 above and in a case where the reproduction quality is poor, it may detect the phase by deleting the state transition patterns relating to the 2 T pattern alone in Table 1 set forth above. Consequently, the PLL can be stabilized. Further, the phase detection portion 112 may be configured not to output, as the phase error, state transition patterns having a considerable variance among the state transition patterns set forth in Table 1 above.

The above described, as the method for detecting a phase error, a method that uses the differential metric information about the square of a Euclidean distance using the state transition patterns set forth in Table 1 above. Herein, a further devise to improve the accuracy in the phase detection for synchronization using Equation (2) above will be described.

In order to overcome intersymbol interference and SNR deterioration in high density recording, Equation (2) above described a method of detecting the phase information from five points. It is true that this method is quite useful means. However, there is a case where the phase information cannot be detected appropriately always, for example, when the input waveform is distorted significantly from the ideal waveform. As a case where the phase information cannot be detected appropriately, an asymmetric waveform of a recording mark and a space in which the input waveform is distorted considerably is an outstanding example. The asymmetric waveform is a waveform in which the maximum amplitude portion of a recording mark or the maximum amplitude portion of a space displaces considerably from the ideal waveform. Another example is a case where the phase information cannot be detected appropriately because information about a waveform displaced significantly from the ideal waveform is detected as the phase information.

Figure 9:
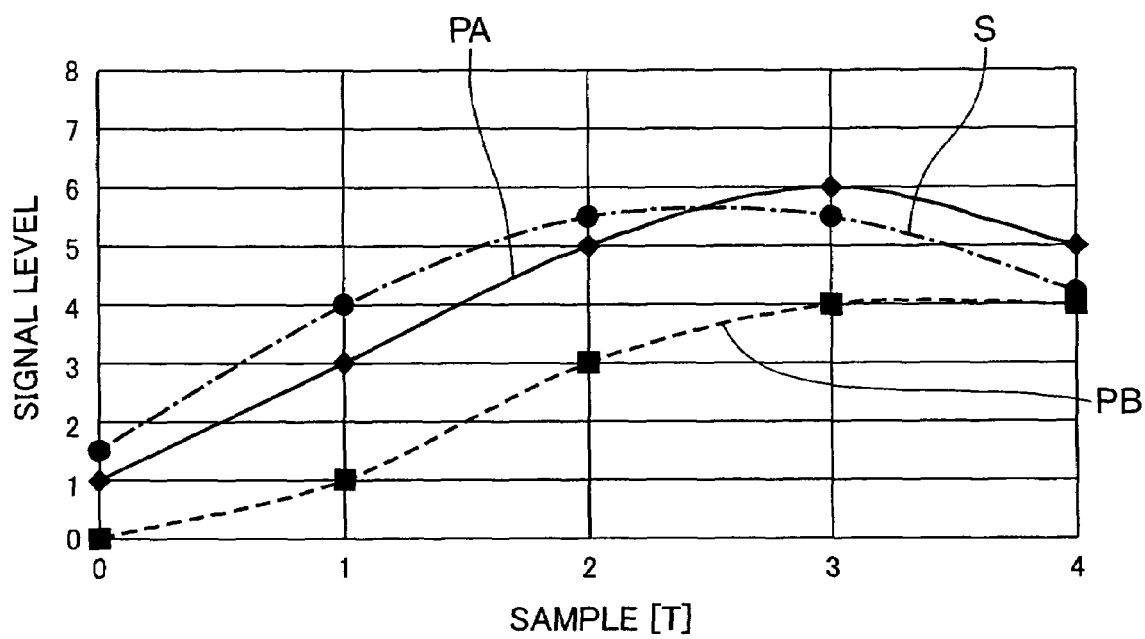
FIG. 9 is a view showing examples of an input waveform when the phase displaces significantly, an ideal waveform of a path A, and an ideal waveform of a path B.

FIG. 9 is a view showing examples of an input waveform S in a case where the phase displaces significantly, an ideal waveform PA of the path A, and an ideal waveform PB of the path B. FIG. 9 shows an example in a case where the path A is detected as a correct path and the phase is detected with a delay of about 90 degrees from the ideal point of the path A. Also, examples of concrete numerical values of the input waveform S, the ideal waveform PA of the path A, and the ideal waveform PB of the path B are set forth in Table 5 below.

TABLE 5

| SAMPLE [T] | 0 | 1 | 2 | 3 | 4 |
|---|---|---|---|---|---|
| INPUT WAVEFORM S | 1.5 | 4 | 5.5 | 5.5 | 4.2 |
| IDEAL WAVEFORM PA OF PATH A | 1 | 3 | 5 | 6 | 5 |
| IDEAL WAVEFORM PB OF PATH B | 0 | 1 | 3 | 4 | 4 |
| $(PathA - S)^2$ | 0.25 | 1 | 0.25 | 0.25 | 0.64 |
| $(PathB - S)^2$ | 2.25 | 9 | 6.25 | 2.25 | 0.04 |

The phase error calculated in according with Equation (2) above using the numerical values set forth in Table 5 above is found to be +3.4. Because the phase error is calculated using sample values at five points in accordance with Equation (2) above, there is a case where distortion of the waveform at the sample time 0 and the sample time 4 has significant influences on the phase information. To avoid such an inconvenience, this embodiment proposes a method by which the sample time 0 and the sample point 4 susceptible to distortion of the waveform among the five points are not used for the phase error detection.

More specifically, the phase detection portion 112 extracts, during the maximum likelihood decoding, a phase error using partial response equalization ideal values at sample times other than the top sample time and the last sample time from the state transition patterns having only a single zero cross point among the differential metrics at a plurality of merging points at which a set of paths branched from a given state will merge.

In this case, in Equation (2) above, only the sample times 1, 2, and 3 are used. The phase error detection is thus expressed as Equation (3):

$$\text{PHASE ERROR} = \left| \sum_{i=1}^{3} (PathA_i - S_i)^2 - \sum_{i=1}^{3} (PathB_i - S_i)^2 \right| - 12 \quad (3)$$

The phase error calculated using Equation (3) above is found to be +4.0. Hence, the phase displacement can be detected at a higher degree of accuracy than in accordance with Equation (2) above. Hence, even in a case where the phase is distorted significantly it is still possible to detect the phase error at a high degree of accuracy by detecting the phase error in accordance with Equation (3) above. It is therefore possible to increase the gain of the phase loop appropriately.

Consequently, it is expected that a rate and stability of the phase entrainment of the PLL can be enhanced.

Herein, attention has been paid to the state transition patterns set forth in Table 1 above and in which the square of a Euclidean distance is 14 as the patterns in which the phase error by PR 12221 ML can be detected. Further, by also taking distortion of the waveform into account, it has been proposed not to detect the phase information (error information) from all the ideal waveforms of five samples, but to detect the phase error from the sample values less susceptible to distortion of the waveform. Owing to the proposals of this embodiment, it becomes possible to provide the most suitable phase detection portion for the waveforms having undergone the influences of intersymbol interference, SNR deterioration, and the waveform distortion in the case of a high recording density waveform.

With the phase detection portion of this embodiment, PR 12221 ML has been described as a concrete example and a proposal has been made as to the selection of sample values among the state transition patterns in which the square of a Euclidean distance is 14. However, when another type of PRML is used, attention should be paid to the squares of other Euclidean distances, so that the phase detection is performed on the basis of the sample values less susceptible to various stresses in the state transition patterns in which the square of a Euclidean distance is another value. It should be appreciated that the sample values used when detecting a phase error is not limited to the three sample values specified above in this embodiment. The phase error only has to be detected from appropriate sample points in PRML adopted, and the phase error can be expressed by Equation (4):

$$\text{PHASE ERROR} = \left| \sum_{i=n}^{m} (\text{Path}A_i - S_i)^2 - \sum_{i=n}^{m} (\text{Path}B_i - S_i)^2 \right| - L \quad (4)$$

In Equation (4) above, n and m mean that the phase error can be detected with arbitrary samples among patterns with which the phase error can be detected. Also, L is the square of a Euclidean distance between the ideal waveform PA of the path A and the ideal waveform PB of the path B found from the samples determined with n and m.

More specifically, the phase detection portion 112 extracts, during the maximum likelihood decoding, a phase error using a PR (Partial Response) equalization ideal value at a second sample time less susceptible to distortion of the waveform of an input signal than at a first sample time among the state transition patterns having a single zero cross point alone among the differential metrics at a plurality of merging points at which a set of paths branched from a given state will merge. Herein, the first sample time includes the top sample time and the last sample time, and the second sample time includes sample times other than the top sample time and the last sample time.

Figure 10:
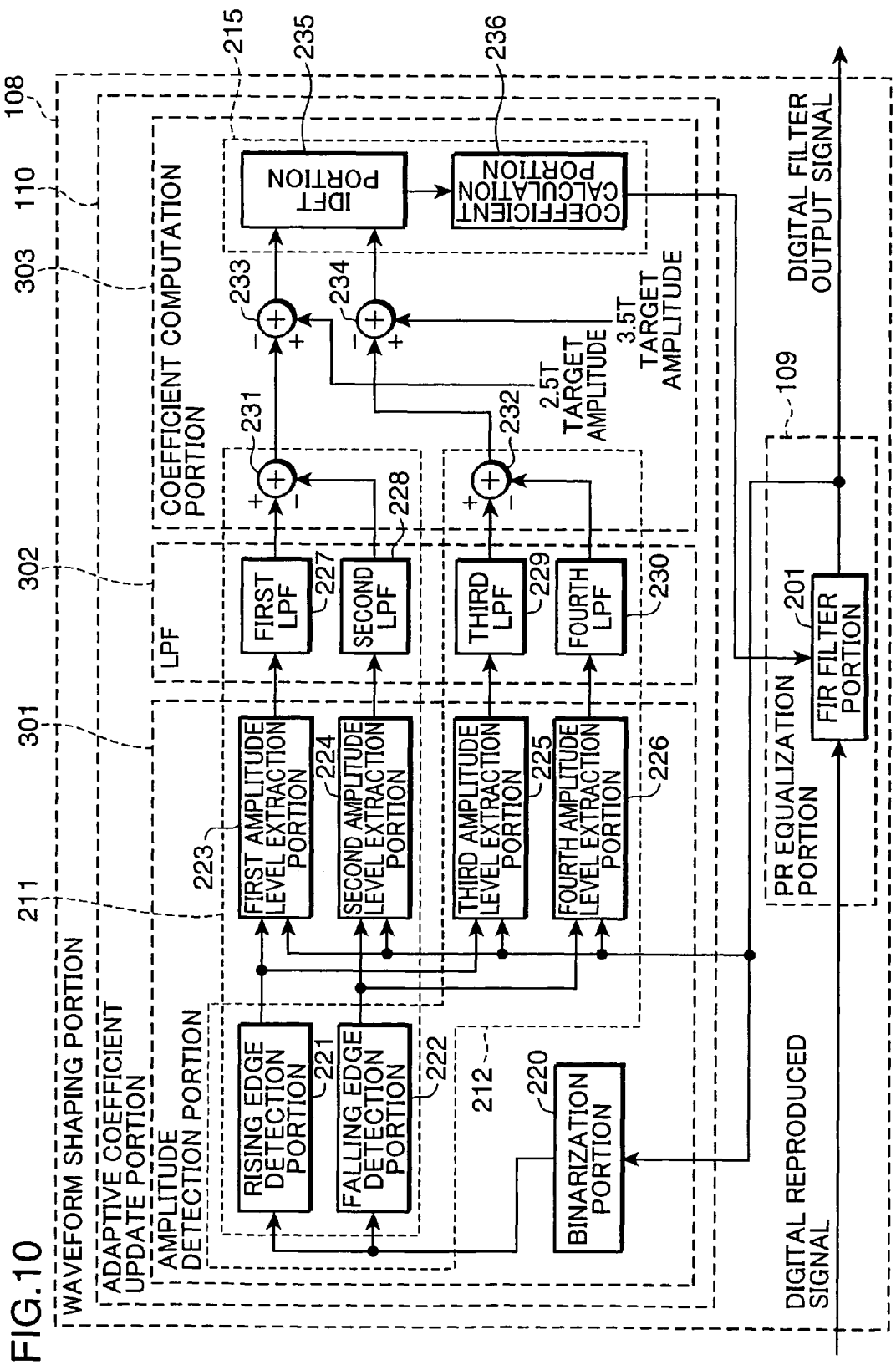
FIG. 10 is a block diagram showing the configuration of a waveform shaping portion that uses a frequency sampling algorithm.

The configuration of a waveform shaping portion different from the waveform shaping portion 108 shown in FIG. 7 will now be described. FIG. 10 is a block diagram showing the configuration of the waveform shaping portion using a frequency sampling algorithm. FIG. 7 shows an example of the configuration in a case where the LMS algorithm is used. With reference to FIG. 10, an example of the configuration to update the filter coefficients adaptively using the frequency sampling algorithm will be described.

Referring to FIG. 10, the waveform shaping portion 108 includes a PR equalization portion 109 and an adaptive coefficient update portion 110. The PR equalization portion 109 includes an FIR filter portion 201. The FIR filter portion 201 in FIG. 10 is of the same configuration as the FIR filter portion 201 in FIG. 7. The adaptive coefficient update portion 110 is formed of an amplitude detection portion 301, an LPF (Low Pass Filter) 202, and a coefficient computation portion 303.

The amplitude detection portion 301 includes a binarization portion 220, a rising edge detection portion 221, a falling edge detection portion 222, a first amplitude level extraction portion 223, a second amplitude level extraction portion 224, a third amplitude level extraction portion 225, and a fourth amplitude level extraction portion 226. The LPF 302 includes a first LPF 227, a second LPF 228, a third LPF 229, and a fourth LPF 230. The coefficient computation portion 303 includes a first amplitude level calculation portion 231, a second amplitude level calculation portion 232, a first amplitude error detection portion 233, a second amplitude error detection portion 234, an IDFT (Inverse Discrete Fourier Transform) portion 235, and a coefficient calculation portion 236.

The first amplitude level detection portion 211 includes the rising edge detection portion 221, the falling edge detection portion 222, the first amplitude level extraction portion 223, the second amplitude level extraction portion 224, the first LPF 227, the second LPF 228, and the first amplitude level calculation portion 231. The second amplitude level detection portion 212 includes the rising edge detection portion 221, the falling edge detection portion 222, the third amplitude level extraction portion 225, the fourth amplitude level extraction portion 226, the third LPF 229, the fourth LPF 230, and the second amplitude level calculation portion 232. The coefficient calculation portion 215 includes the IDFT portion 235 and the coefficient calculation portion 236.

The first amplitude level detection portion 211 detects an N'th amplitude level from the predetermined reference level in an output of the FIR filter portion 201. The second amplitude level detection portion 212 detects an M'th (M>N) amplitude level from the predetermined reference level in an output of the FIR filter portion 201.

The binarization portion 220 converts a digital filter output signal outputted from the FIR filter portion 201 into a binary form. The digital filter output signal converted into a binary form is outputted to the rising edge detection portion 221 and the falling edge detection portion 222.

The rising edge detection portion 221 detects a rising edge (zero cross point) from the digital filter output signal outputted from the FIR filter portion 201. The falling edge detection portion 222 detects a falling edge (zero cross point) from the digital filter output signal outputted from the FIR filter portion 201.

The first amplitude level extraction portion 223 extracts an N'th amplitude level from the rising edge (zero cross point) detected by the rising edge detection portion 221. It should be noted that, in this embodiment, the first amplitude level extraction portion 223 extracts the amplitude level following the rising edge detected by the rising edge detection portion 221.

The second amplitude level extraction portion 224 extracts an N'th amplitude level from the falling edge (zero cross point) detected by the falling edge detection portion 222. It should be noted that, in this embodiment, the second amplitude level extraction portion 224 extracts the amplitude level following the falling edge detected by the falling edge detection portion 222.

The third amplitude level extraction portion 225 extracts an M'th (M>N) amplitude level from the rising edge (zero cross point) detected by the rising edge detection portion 221. It should be noted that, in this embodiment, the third amplitude level extraction portion 225 extracts the amplitude level, which is the amplitude level that follows the amplitude level following the rising edge (zero cross point) detected by the rising edge detection portion 221 and monotonously increases from the amplitude level following the zero cross point.

The fourth amplitude level extraction portion 226 extracts an M'th (M>N) amplitude level from the falling edge (zero cross point) detected by the rising edge detection portion 222. It should be noted that, in this embodiment, the fourth amplitude level extraction portion 226 extracts the amplitude level, which is the amplitude level that follows the amplitude level following the rising edge (zero cross point) detected by the falling edge detection portion 222 and monotonously decreases from the amplitude level following the zero cross point.

The first LPF 227 passes the N'th amplitude level extracted by the first amplitude level extraction portion 223. The second LPF 228 passes the N'th amplitude level extracted by the second amplitude level extraction portion 224.

The third LPF 229 passes the M'th amplitude level extracted by the third amplitude level extraction portion 225. The fourth LPF 230 passes the M'th amplitude level extracted by the fourth amplitude level extraction portion 226.

The first amplitude level calculation portion 231 calculates a difference (amplitude La) between the N'th amplitude level extracted by the first amplitude level extraction portion 223 and the N'th amplitude level extracted by the second amplitude level extraction portion 224.

The second amplitude level calculation portion 232 calculates a difference (amplitude Lb) between the M'th amplitude level extracted by the third amplitude level extraction portion 225 and the M'th amplitude level extracted by the fourth amplitude level extraction portion 226.

The first amplitude error detection portion 233 detects a difference between the amplitude level detected by the first amplitude level detection portion 211 and a first target amplitude. To be more concrete, the first amplitude error detection portion 233 calculates an amplitude error Aerr on the basis of the amplitude La calculated by the first amplitude level calculation portion 231 and the first target amplitude Ta.

The second amplitude error detection portion 234 detects a difference between the amplitude level detected by the second amplitude level detection portion 212 and a second target amplitude that is different from the first target amplitude. To be more concrete, the second amplitude error detection portion 234 calculates an amplitude error Berr on the basis of the amplitude Lb calculated by the second amplitude level calculation portion 232 and the second target amplitude Tb.

The coefficient calculation portion 215 calculates coefficients of the FIR filter portion 201 on the basis of the outputs of the first amplitude error detection portion 233 and the second amplitude error detection portion 234.

The IDFT portion 235 applies inverse discrete Fourier transform to the outputs of the first amplitude error detection portion 233 and the second amplitude error detection portion 234. The coefficient calculation portion 236 calculates the coefficients (tap coefficients C0 through C4) of the FIR filter portion 201. A calculation method of the coefficients will be described below.

Hereinafter, a concrete operation of the waveform shaping portion 108 shown in FIG. 10 will be described.

The frequency sampling algorithm is a method of designing the coefficients of an FIR filter by which an impulse response h[n] (filter coefficient) is found by applying inverse discrete Fourier transform (IDFT) to sample values found by sampling the frequency response between $-\omega s/2$ to $\omega s/2$ at N points (the frequency width is $\omega s/N$). It is characterized in that, in this embodiment, in order to find the filter coefficients adaptively, the respective band gains are fed back so that the amplitude of the band becomes the target amplitude, and the FIR filter coefficients are controlled using the frequency sampling algorithm on the basis of the respective band gains that have been fed back. In general, the impulse response h[n] is expressed by Equation (5) and Equation (6):

$$h[n] = \frac{1}{N} \sum_{k=-N/2+1}^{N/2} H(k) W^{-kn} \tag{5}$$

$$W = e^{-j\frac{2}{N}} \tag{6}$$

Figure 11:
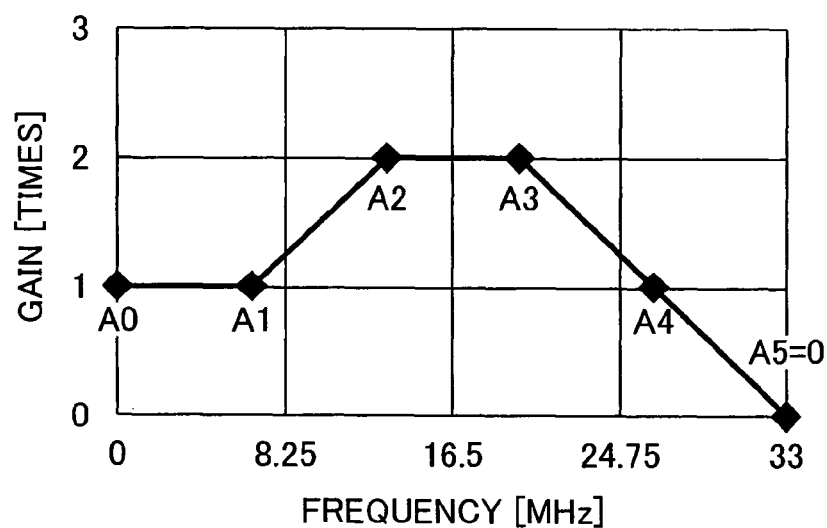
FIG. 11 is a view showing gain characteristic target values at respective frequencies of a 9-tap FIR filter (digital equalizer)
Figure 12:
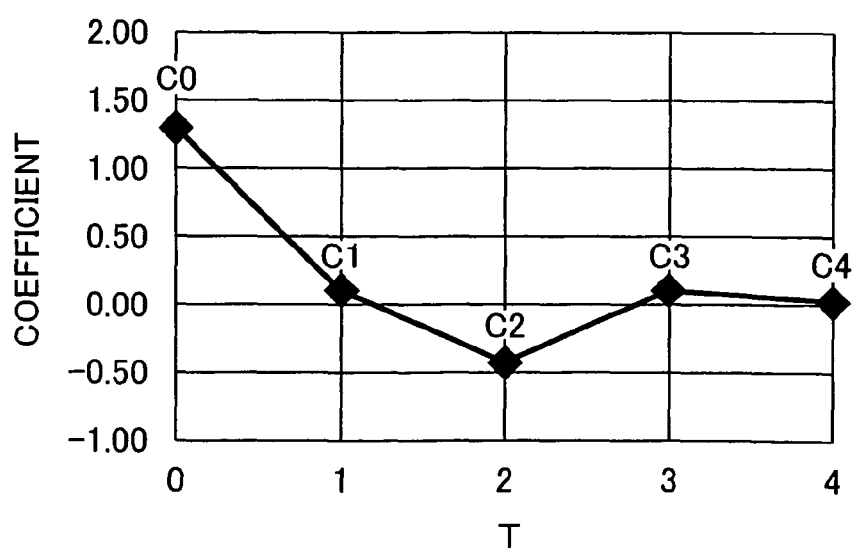
FIG. 12 is a view showing tap coefficients of a digital equalizer found in accordance with Equation (5) below using the frequency sampling algorithm on the basis of the gain characteristic target values.
Figure 13:
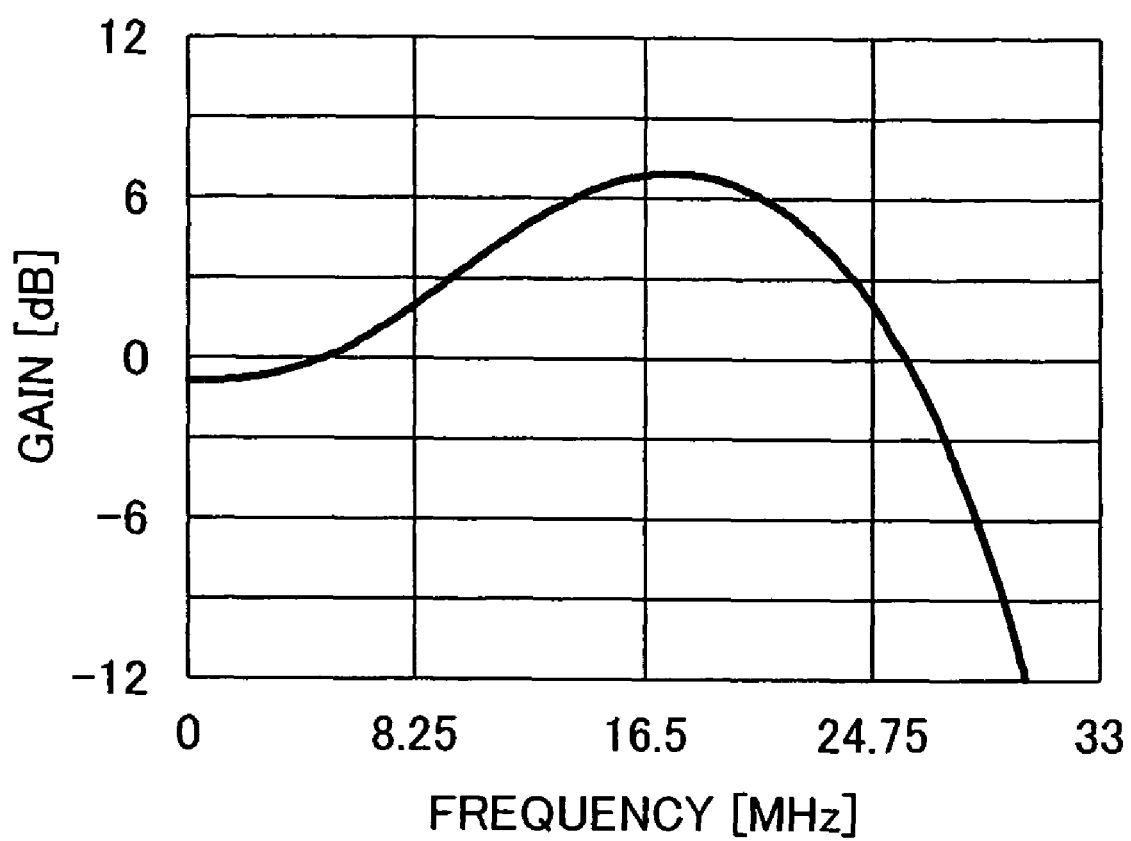
FIG. 13 is a view showing the frequency characteristic of the digital equalizer calculated from the tap coefficients.

An example of the method of finding the coefficients of a 9-tap FIR filter (digital equalizer) will now be described using FIG. 11, FIG. 12, and FIG. 13. FIG. 11 is a view showing the gain characteristic target values at the respective frequencies of the 9-tap FIR filter (digital equalizer). FIG. 12 is a view showing the tap coefficients (C0 through C4) of the digital equalizer found in accordance with Equation (5) above using the frequency sampling algorithm on the basis of the gain characteristic target values. FIG. 13 is a view showing the frequency characteristic of the digital equalizer calculated on the basis of the tap coefficients.

The amplitude detection portion 301 detects the amplitude of the waveform that has been passed through the digital equalizer having the characteristics shown in FIG. 11, FIG. 12, and FIG. 13 and feeds back the detection result to the coefficients of the nine taps so that the detection result becomes the target amplitudes at the respective frequency bands. A description will be given in an example case where a BD is reproduced at 1× speed as follows. That is, the frequency sampling interval to control the gain is found to be: 66 MHz÷(9 taps+1)=6.6 MHz. Herein, as is shown in FIG. 11, by setting the gain characteristic target values at an interval of about 6.6 MHz, points A0 through A5 can be defined. The point A0 is a gain of DC (0 MHz), the point A1 is a gain of 5 T (6.6 MHz), the point A2 is a gain of 2.5 T (13.2 MHz), the point A3 is a gain of 1.67 T (19.8 MHz), the point A4 is a gain of 1.25 T (26.4 MHz), and the point A5 is a gain of 1 T (33.0 MHz).

The tap coefficients C0 through C4 of the digital equalizer calculated in accordance with Equation (5) above are found, respectively, by Equations (7) through (11):

$$C_0 = \frac{A_0}{10} + \frac{A_1 + A_2 + A_3 + A_4}{5} \tag{7}$$

$$C_1 = \frac{A_0}{10} + 0.162 A_1 + 0.062 A_2 - 0.062 A_3 - 0.162 A_4 \tag{8}$$

$$C_2 = \frac{A_0}{10} + 0.062 A_1 - 0.162 A_2 - 0.162 A_3 + 0.062 A_4 \tag{9}$$

$$C_3 = \frac{A_0}{10} - 0.062 A_1 - 0.162 A_2 + 0.162 A_3 + 0.062 A_4 \tag{10}$$

$$C_4 = \frac{A_0}{10} - 0.162 A_1 + 0.062 A_2 + 0.062 A_3 - 0.162 A_4 \tag{11}$$

Figure 14A:
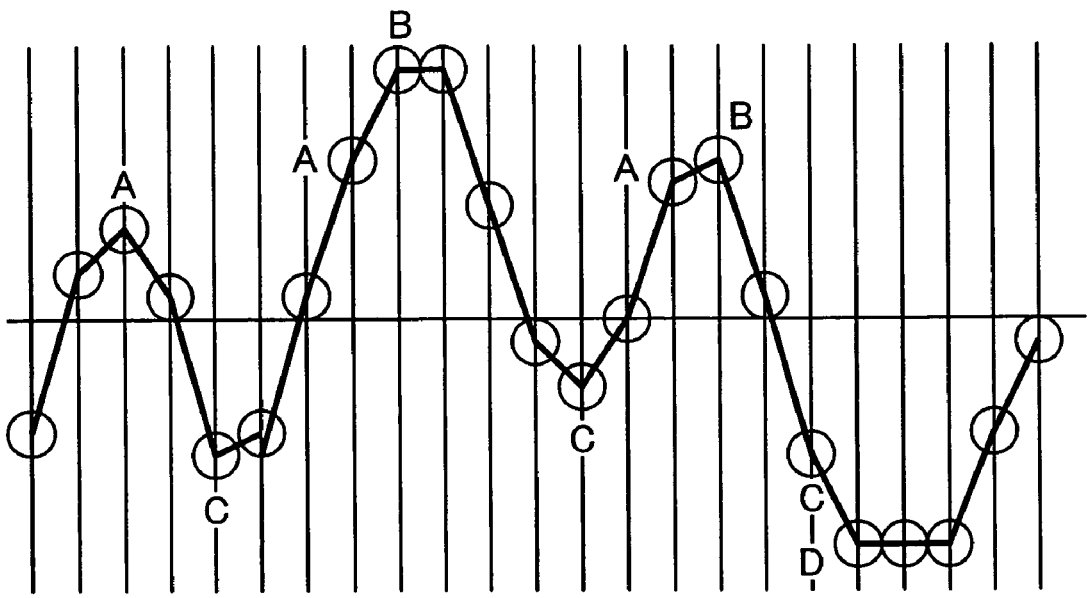
FIG. 14A is a view used to describe amplitude detection for calculating coefficients using the frequency sampling algorithm.
Figure 14B:
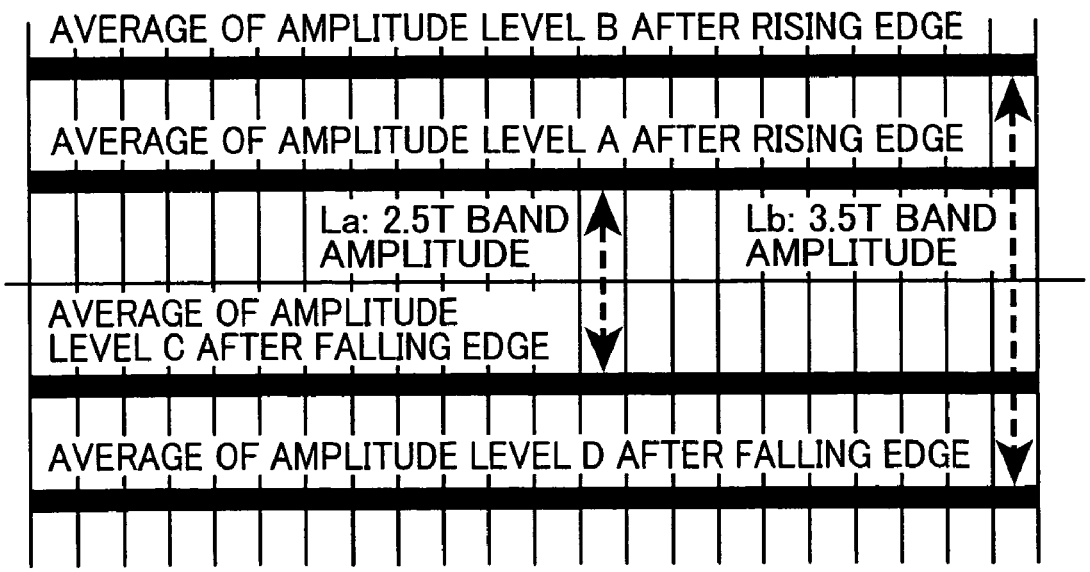
FIG. 14B is a view showing the processing result by an LPF on respective amplitude levels shown in FIG. 14A.

The amplitude detection method and the feedback control on the band gain will now be described. FIG. 14A is a view used to describe the amplitude detection in a coefficient calculation using the frequency sampling algorithm. FIG. 14B is a view showing the processing result by the LPF at the respective amplitude levels A through D shown in FIG. 14A.

The amplitude detection portion 301 detects, in reference to the zero cross point of an output of the digital equalizer, a sample point following the zero cross point and a sample point that follows the sample point following the zero cross point and monotonously increases or monotonously decreases from the sample point following the zero cross point.

In the case of the amplitude level A or the amplitude level C shown in FIG. 14A, the sample point following the zero cross point is detected as an average amplitude of 2 T and 3 T. In the case of the amplitude level B or the amplitude level D shown in FIG. 14A, the sample point that follows the sample point following the zero cross point and monotonously increases or monotonously decreases from the sample point following the zero cross point is detected as an average amplitude of 3 T and 4 T. Each sample point is detected in the amplitude detection portion 301 shown in FIG. 10.

FIG. 14B shows a manner in which the amplitudes detected at the respective amplitude levels A through D of FIG. 14A are passed through the LPF having the predetermined characteristic. An amplitude error when the amplitude level A and the amplitude level C are passed through the LPF can be detected as the amplitude La in about the 2.5 T band. Likewise, an amplitude error when the amplitude level B and the amplitude level D are passed through the LPF can be detected as the amplitude Lb in about the 3.5 T band.

The coefficient computation portion 303 calculates an amplitude error on the basis of the amplitude La and the amplitude Lb in the 2.5 T band and the 3.5 T band, respectively, and the target amplitude Ta and the target amplitude Tb. In other words, the coefficient computation portion 303 calculates an amplitude error, Aerr=Ta−La, corresponding to the 2.5 T band, and an amplitude error, Berr=Tb−Lb, corresponding to the 3.5 T band.

Subsequently, the coefficient computation portion 303 finds A0 through A4 by adding up the amplitude error Aerr and the amplitude Berr and adds the result to the respective band gains. For example, the coefficient computation portion 303 is able to find A0 through A4 as follows: A0=a fixed gain of one; A1=a gain of one+Berr; A2=a gain of one+Aerr; A3=a gain of one+Aerr; and A4=a fixed gain of one or less. Once A0 through A4 are found, the coefficient computation portion 303 calculates the tap coefficients C0 through C4 using Equations (7) through Equations (11) above, respectively. The coefficient computation portion 303 then updates the current tap coefficients in the FIR filter portions 201 to the tap coefficients C0 through C4 calculated as above.

In this manner, it is possible to update the tap coefficients of the digital equalizer adaptively in response to the amplitude of an input waveform. The amplitude error and the tap coefficients described above are calculated in the LPF 302 and the coefficient computation portion 303 in FIG. 10.

The wave shaping portion 108 inserted in the loop of the PLL is necessarily formed of an adaptive coefficient update filter. Accordingly, the coefficients calculated using the frequency sampling algorithm are controlled to be right-left symmetrical. The coefficient control under the restriction of right-left symmetry is the control to change a gain at a predetermined frequency alone without having to change the phase relation between the digital reproduced signal inputted into the FIR filter portion 201 and the digital filter output signal outputted therefrom.

In FIG. 14, the amplitude level A and the amplitude level B upper than the reference and the amplitude level C and the amplitude level D lower than the reference are detected, and a difference between the amplitude level A and the amplitude level C is defined as the 2.5 T band amplitude and a difference between the amplitude level B and the amplitude level D is defined as the 3.5 T band amplitude. The invention, however, is not limited to this configuration. Given that the amplitude level A upper than the reference and the amplitude level C lower than the reference are almost the same and the amplitude level B upper than the reference and the amplitude level D lower than the reference are almost the same, it is sufficient to detect two amplitudes.

The embodiment using FIG. 11 is of the configuration to detect a plurality of amplitudes. The invention, however, is not limited to this configuration. It may be configured in such a manner so as to detect amplitudes of particular frequencies alone. Even when only one amplitude is to be detected, adequate coefficients can be calculated given that the amplitudes of a mark and a space are the same or on the precondition that the amplitudes of a mark and a space are the same. For example, of A0 through A5 described above, the amplitude of A3 alone may be detected and the amplitudes of the rest of A0, A1, A2, A4, and A5 may be estimated from the amplitude of A3. The result may possibly vary from a desired filter characteristic in comparison with a case where the amplitude values of all A0 through A5 are detected. However, a determination can be made from the selection of the circuit size and the performance. This alternative method is more useful in a case where a filter having fewer taps is used.

The adaptive coefficient update filter is inserted in the loop of the PLL of this embodiment. The purpose of this configuration is to meet the need for a waveform that will be inputted into the maximum likelihood decoding portion 111 to be shaped into the waveform expected in Viterbi decoding before it is inputted because the maximum likelihood decoding portion 111 extracts a phase error during the Viterbi decoding process. By inputting a waveform after it is shaped into the waveform expected in Viterbi decoding, phase error detection accuracy can be enhanced, which makes the PLL control more stable.

The adaptive coefficient update filter using the frequency sampling algorithm does not require binarization accuracy that is necessary to generate a teacher signal (expected value level) in the LMS algorithm. The adaptive coefficient update filter using the frequency sampling algorithm is therefore able to calculate adequate filter coefficients in a stable manner for a poor quality waveform. In addition, it is possible to achieve stable adaptive control even during the PLL entrainment (non-synchronous state).

The adaptive coefficient update filter using the LMS algorithm finds the respective tap coefficients from the correlation with a waveform inputted therein. The adaptive coefficient update filter using the LMS algorithm therefore has a high degree of freedom in controlling the respective tap coefficients in comparison with the frequency sampling algorithm and is thus able to filter the waveform to have the characteristic closer to the expected PR characteristic.

Although it is not shown in FIG. 6, a block that appropriately controls the DC level of a waveform may be inserted between the A/D conversion portion 106 and the waveform shaping portion 108. A waveform to be inputted into the A/D conversion portion 106 is controlled to be amplitude-centered by the AGC/OFFSET control portion 107 so that it can fully use the D range. The block that appropriately controls the DC level controls the DC level to be energy-centered and inputs the result into the waveform shaping portion 108. The control on the DC level is performed particularly so as to apply filtering to an asymmetric waveform in a more appropriate manner. It should be noted, however, that even when the block that appropriately controls the DC level is inserted, it is still necessary to input the waveform into the AGC/OFFSET control portion 107 from the A/D conversion portion 106.

It should be appreciated that the adaptive coefficient update waveform shaping method using the frequency sampling algorithm of this embodiment is not a method corresponding only to a reproduced waveform in a case where an optical disc having a higher recording line density than a conventional optical disc is to be reproduced. It is also applicable to a reproduced waveform of a conventional BD having a recording capacity of 25 GB as well as to a reproduced waveform of a DVD or a CD. The equalizer gains only have to be set to achieve the desired characteristic.

The embodiment above described the adaptive coefficient update method using the frequency sampling algorithm in a case where there are nine taps. It should be appreciated, however, that the tap coefficients can be updated adaptively in the same manner as above even there are a different number of taps. For example, the FIR filter portion 201 may have seven taps or eleven taps.

Second Embodiment

Figure 15:
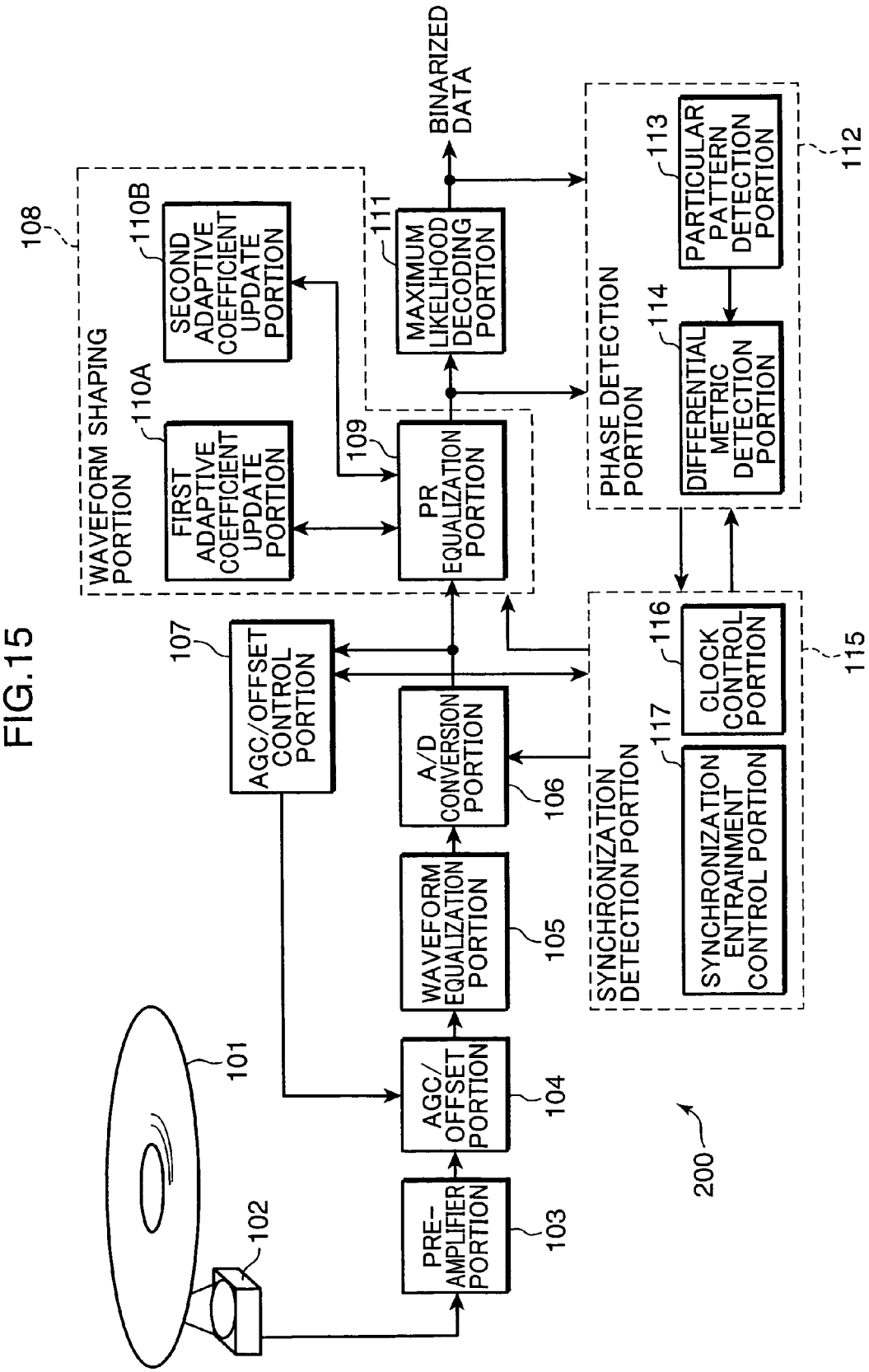
FIG. 15 is a block diagram showing the configuration of an optical disc device according to a second embodiment of the invention.

An optical disc device according to a second embodiment of the invention will be described first. FIG. 15 is a block diagram showing the configuration of the optical disc device according to the second embodiment of the invention.

The optical disc device of FIG. 15 is almost of the same configuration and operates almost in the same manner as the optical disc device of FIG. 6. Accordingly, only differences in configuration and operation from the optical disc device of FIG. 6 will be described herein.

In an optical disk device 200 shown in FIG. 15, the waveform shaping portion 108 includes a first adaptive coefficient update portion 110A and a second adaptive coefficient update portion 110B. The first adaptive coefficient update portion 110A updates the tap coefficients of the FIR filter in the PR equalization portion 109 using the LMS algorithm. The second adaptive coefficient update portion 110B updates the tap coefficients of the FIR filter in the PR equalization portion 109 using the frequency sampling algorithm.

The adaptive coefficient update filter using the frequency sampling algorithm does not require binarization accuracy that is necessary to generate a teacher signal (expected value level) in the LMS algorithm. Hence, the adaptive coefficient update filter using the frequency sampling algorithm is able to calculate adequate filter coefficients for a poor quality waveform in a stable manner. It is also possible to achieve stable adaptive control during the PLL entrainment (asynchronous state).

The adaptive coefficient update filter using the LMS algorithm finds respective tap coefficients from the correlation with a waveform inputted therein. The adaptive coefficient update filter using the LMS algorithm therefore has a higher degree of freedom in controlling the respective tap coefficients in comparison with the frequency sampling algorithm and is thus able to filter the waveform to have a characteristic closer to the expected PR characteristic.

In this embodiment, two adaptive coefficient update portions are switched in response to a state of the optical disc device by utilizing the characteristics of these two adaptive equalization methods, that is, the frequency sampling algorithm and the LMS algorithm. By appropriately switching the two adaptive coefficient update portions, the optical disc device is able to perform an optimal gain correction that best suits an input waveform through selection of the adaptive method that best suits the situation. Consequently, not only is it possible to stabilize the PLL control, but it is also possible to enhance the convergence of the PLL control (shortening of the entrainment time). Because the configurations of the respective adaptive coefficient update portions have been described in the first embodiment above, the description is omitted herein.

An operation of the optical disc device configured as above will now be described.

The synchronization entrainment control portion 117 in the synchronization detection portion 115 controls, as is set forth in Table 6 below, the AGC/OFFSET control portion 107, the first adaptive coefficient update portion 110A in the waveform shaping portion 108, the second adaptive coefficient update portion 110B in the waveform shaping portion 108, and the particular pattern detection portion 113 in the phase detection portion 112.

TABLE 6

| CONTROL STATE | AGC/OFFSET CONTROL PORTION 107 | FIRST ADAPTIVE COEFFICIENT UPDATE PORTION 110A | SECOND ADAPTIVE COEFFICIENT UPDATE PORTION 110B | PARTICULAR PATTERN DETECTION PORTION 113 |
|---|---|---|---|---|
| BEFORE TRACKING CONTROL IS ENABLED | OFF | OFF | OFF | OFF |
| BEFORE AGC/OFFSET CONVERGENCE IS ENABLED | ON | OFF | ON | OFF |
| BEFORE FREQUENCY ENTRAINMENT IS ENABLED | ON | OFF | ON | OFF (DETECT SYNCHRONIZATION MARK) |
| BEFORE PHASE ENTRAINMENT IS ENABLED | ON | OFF | ON | TABLE 1 (ALL PATTERNS) |
| AFTER PHASE ENTRAINMENT IS ENABLED | ON | ON | OFF | TABLE 1 (DELETE 2T PATTERNS) |

As examples of the control state, states are classified into states before the tracking control is enabled, before the AGC/OFFSET convergence is enabled, before the frequency entrainment is enabled, before the phase entrainment is enabled, and after the phase entrainment is enabled, each of which will be described below.

The content of Table 6 above is almost the same as the operation of the optical disc device described using Table 4 above in the first embodiment above. Herein, a description will be given only to a portion involved with the switching control operation on the adaptive coefficient update portions in the waveform shaping portion 108, which is different from the content of Table 4 above.

In a state before the tracking control is enabled, the synchronization entrainment control portion 117 in the synchronization detection portion 115 maintains the control on the first adaptive coefficient update portion 110A and the second adaptive coefficient update portion 110B in the waveform shaping portion 108 in an OFF state.

In a state after the tracking control is enabled, the synchronization entrainment control portion 117 in the synchronization detection portion 115 activates the second adaptive coefficient update portion 110B in the waveform shaping portion 108 and keeps it operating until the phase entrainment is completed. Meanwhile, the PR equalization portion 109 receives tap coefficients that will update the current ones constantly from the second adaptive coefficient update portion 110B.

In a state after the phase entrainment is enabled, the synchronization entrainment control portion 117 in the synchronization detection portion 115 switches the operation control from the second adaptive coefficient update portion 110B to the first adaptive coefficient update portion 110A in the waveform shaping portion 108. The PR equalization portion 109 thus receives the tap coefficients that will update the current ones constantly from the first adaptive coefficient update portion 110A. In this instance, the first adaptive coefficient update portion 110A uses the coefficients calculated in the second adaptive coefficient update portion 110B as the initial values of the tap coefficients when the control is switched to the first adaptive coefficient update portion 110A.

Table 6 above shows a case where the AGC/OFFSET control portion 107 and the second adaptive coefficient update portion 110B in the waveform shaping portion 108 are operated simultaneously after the tracking control is enabled. The invention, however, is not particularly limited to this configuration. It may be configured in such a manner that the AGC/OFFSET control portion 107 alone is activated first after the tracking control is enabled and then the second adaptive coefficient update portion 110B in the waveform shaping portion 108 is activated when an operation of the AGC/OFFSET portion 104 becomes closer to the predetermined target value.

This is because both the first adaptive coefficient update portion 110A and the second adaptive coefficient update portion 110B in the waveform shaping portion 108 are designed to operate in a stable manner on the precondition that the offset and the amplitude of the waveform fall within a predetermined value. In addition, because the adaptive coefficient update control also has a capability of correcting the amplitude of the waveform, it possibly becomes unstable in association with the AGC that corrects the amplitude of the waveform.

It is therefore preferable to perform control by clearly defining the capabilities and the bands. Accordingly, it is more preferable that the synchronization entrainment control portion 117 does not activate the second adaptive coefficient update portion 110B or the phase detection portion 112 until the operation of the AGC/OFFSET portion 104 converges within the predetermined value. The phrase, "to fall within the predetermined value", referred to herein means a case where the AGC control or the OFFSET control has converged to a range within about 90% of the target value. For example, given 800 mV as the target AC amplitude, then it is sufficient for the AGC control to reach 720 mV or greater. The same can be said about the OFFSET control. The predetermined value can be set to a value at which the system is stabilized.

It should be appreciated that this embodiment is not limited to the examples of the control states set forth in Table 6 above. In other control states and in the control states set forth in Table 6 above, the control only has to be optimized so that the system is stabilized.

The embodiment above described the phase detecting device, the optical disc device, and the phase detection method for the synchronization method of a reproduced signal in a case where the recording line density of an optical disc is enhanced. Herein, influences of the enhanced recording line density on the waveform will be described using FIG. 16 and FIG. 17 in the case of a BD by way of example.

Figure 16:
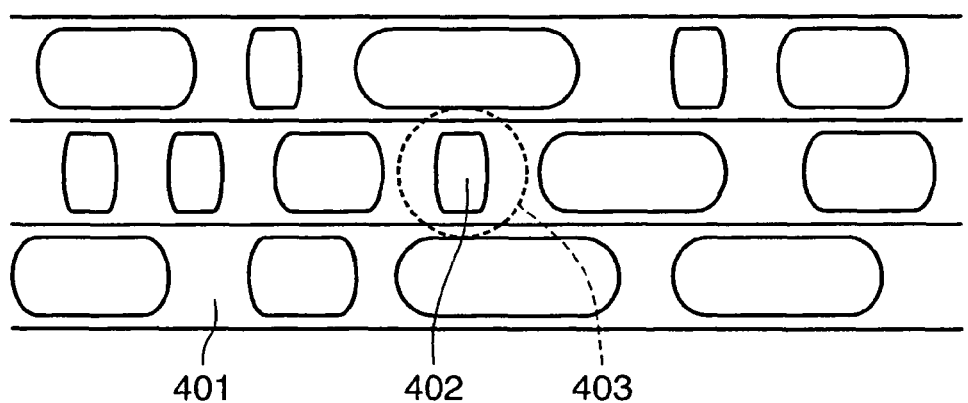
FIG. 16 is a view showing the relative relation between a mark sequence recorded on a track of an optical disc and a light beam diameter.

FIG. 16 is a view showing the relative relation between a mark sequence recorded on a track of an optical disc and a light beam diameter. As in a DVD, recording data is recorded in a BD in the form of mark sequences as a physical change on an optical disc. A mark sequence having the shortest length among the mark sequences is referred to the shortest mark. In the case of a BD having a recording capacity of 25 GB, the physical length of the shortest mark 402 is 0.149 µm. The shortest mark length of a BD corresponds about 1/2.7 of the shortest mark length of a DVD. It is therefore nearing the limit of the optical resolution at which a recording mark can be identified by a light beam even when the resolution of the laser is increased by changing the wavelength parameter (405 nm) and the NA parameter (0.85) in the optical system.

Referring to FIG. 16, a light beam 403 is irradiated to a mark sequence recorded on a track 401. In a BD, the diameter of a light spot is about 0.39 µm because of the optical system parameters specified above. In a case where the recording line density is enhanced without changing the structure of the optical system, the recording mark becomes smaller relatively with respect to the light spot diameter, which deteriorates the reproduction resolution.

In a case where a recording mark is reproduced with a light beam, the amplitude of a reproduced signal decreases as the recording mark becomes shorter and reaches 0 at the limit of the optical resolution. The inverse number of the cycle of the recording mark is referred to as a spatial frequency, and the relation between the spatial frequency and the signal amplitude is referred to as an OTF (Optical Transfer Function). The signal amplitude decreases almost linearly as the spatial frequency becomes higher and the limit of reproduction at which the signal amplitude decreases to 0 is referred to as the OTF cutoff.

Figure 17:
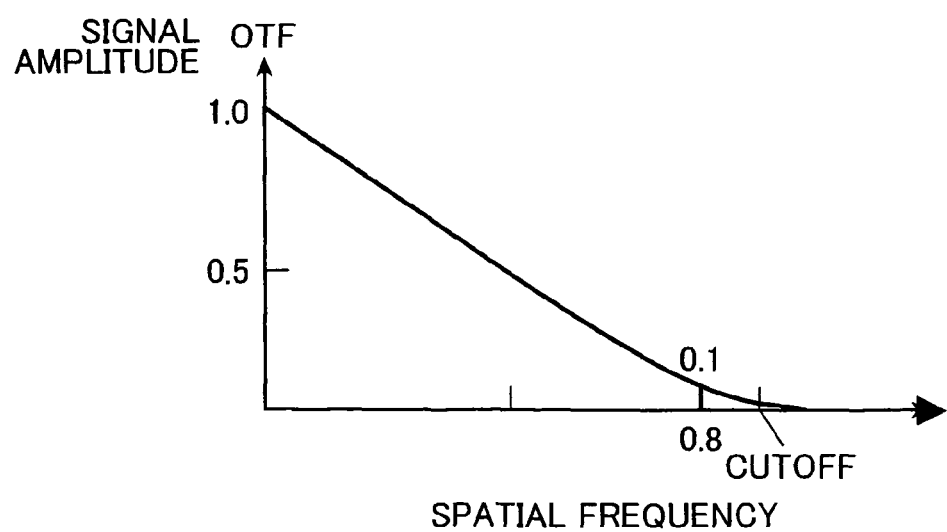
FIG. 17 is a view showing an OTF of a BD having a recording capacity of 25 GB.

FIG. 17 is a view showing the OTF of a BD having a recording capacity of 25 GB. The spatial frequency of the shortest mark of a BD is about 80% of the OTF cutoff and nears the OTF cutoff. Also, it is understood that the reproduction amplitude of the shortest mark becomes as small as about 10%. In the case of a BD, when a recording capacity is as large as about 31 GB, the frequency of the shortest mark is the OTF cutoff and the reproduction amplitude is hardly detected. When the frequency of the shortest mark is in the vicinity of the OTF cutoff frequency or exceeds the OTF cutoff frequency, the reproduction amplitude of a reproduced signal becomes small because the resolution of the laser has reached or exceeded its limit. The SNR therefore deteriorates abruptly.

As has been described, the relation between the spatial frequency and the signal amplitude is defined by the OTF. The signal amplitude decreases almost linearly as the spatial frequency becomes higher and the limit of reproduction at which the signal amplitude decreases to 0 is defined as the cutoff frequency of the OTF. The shortest mark frequency of a reproduced signal recorded in an information recording medium is in the vicinity of the cutoff frequency of the OTF.

In this embodiment, the phrase, "in the vicinity of the OTF cutoff frequency", specifies a range from the 2 T frequency to the OTF cutoff frequency within which a recording capacity of a BD per layer is 30 GB. In this case, the physical length of 2 T is about 0.124 µm. In short, the frequency of the shortest mark is in the vicinity of the OTF cutoff frequency. Also, the phrase, "a frequency exceeding the OTF cutoff frequency", means a density at which recoding is performed with a length not longer than about 0.124 μm, which is the physical length of 2 T.

This embodiment is to propose a synchronous detection method in a case where a region in which information is recorded at a recording line density at which the shortest mark frequency of a reproduced signal recorded in an optical disc is in the vicinity of the OTF cutoff frequency or exceeds the OTF cutoff frequency.

To be more specific, in order to perform the binarization process and the signal evaluation process, for example, a waveform shaping portion and a maximum likelihood decoding portion for the PRML process may be provided in the latter stage of the waveform shaping portion 108 in FIG. 6 and FIG. 15 apart from those of the PRML process for synchronization detection of this embodiment.

The components of the optical disc device of this embodiment can be achieved in the form of an LSI (Large Scale Integration) that is an integrated circuit. The components provided to the optical disc device may be formed in such a manner that each component is formed in one chip or the components are integrated into one chip either partially or entirely.

The integrated circuit is referred to as an LSI herein. It should be noted, however, that it may be referred to also as an IC (Integrated Circuit), an LSI, a super LSI, or an ultra-LSI because of a difference in integration degree.

Also, it should be appreciated that the integrated circuit of this embodiment is not limited to an LSI and it may be achieved by an exclusive-use circuit or a general-purpose processor. Also, it is also possible to use an FPGA (Field Programmable Gate Array) that can be programmed after the LSI is fabricated or a reconfigurable processor in which the connections and settings of circuit cells inside the LSI are reconfigurable.

Further, when a circuit integration technique that replaces an LSI becomes available owing the advancement in the semiconductor technology or other derivative techniques, it goes without saying that the functional blocks can be integrated using this technique. The biotechnology has a potential of such applications.

The specific embodiments described above chiefly contain inventions having the following configurations.

A phase error detecting device according to an aspect of the invention includes: a waveform shaping portion that receives a digital reproduced signal generated from an analog reproduced signal reproduced from an information recording medium and shapes a waveform of the digital reproduced signal; a maximum likelihood decoding portion that applies maximum likelihood decoding to the digital reproduced signal in the waveform shaped by the waveform shaping portion and generates a binarized signal indicating a result of the maximum likelihood decoding; a phase detection portion that detects a phase error on the basis of the digital reproduced signal in the waveform shaped by the waveform shaping portion and the binarized signal generated by the maximum likelihood decoding portion; and a synchronization detection portion that generates a reproduction clock signal using the phase error detected by the phase detection portion and brings the digital reproduced signal in synchronization with the reproduction clock signal that has been generated. The phase detection portion extracts, during the maximum likelihood decoding, the phase error using state transition patterns having only a single zero cross point among differential metrics at a plurality of merging points at which a set of paths branched from a given state merges.

According to this configuration, a digital reproduced signal generated from an analog reproduced signal reproduced from an information recording medium is received and the waveform of the digital reproduced signal is shaped by the waveform shaping portion. The digital reproduced signal in the shaped waveform is then subjected to maximum likelihood decoding by the maximum likelihood decoding portion. A binarized signal indicating the result of the maximum likelihood decoding is thus generated by the maximum likelihood decoding portion. Thereafter, a phase error is detected by the phase detection portion on the basis of the digital reproduced signal in the shaped waveform and the binarized signal that has been generated. In this instance, the phase error is extracted during the maximum likelihood decoding using the state transition patterns having only a single zero cross point among the differential metrics at a plurality of merging points at which a set of paths branched from a given state merges. A reproduction clock signal is then generated using the phase error that has been detected and the digital reproduced signal is brought into synchronization with the reproduction clock signal that has been generated by the synchronization detection portion.

Accordingly, the phase error is extracted during the maximum likelihood decoding using the state transition patterns having only a single zero cross point among the differential metrics at a plurality of merging points at which a set of paths branched from a given state merges. Accuracy in detecting the phase error can be therefore enhanced, which makes it possible to generate a reproduction clock signal in a stable manner.

Also, it is preferable for the phase error detecting device described above that a relation between a spatial frequency and a signal amplitude is defined by an optical transfer function, the signal amplitude decreases almost linearly as the spatial frequency becomes higher, and a limit of reproduction at which the signal amplitude decreases to 0 is defined as a cutoff frequency of the optical transfer function, then a shortest mark frequency of a reproduced signal recorded in the information recording medium is in a vicinity of the cutoff frequency of the optical transfer function.

According to this configuration, the relation between the spatial frequency and the signal amplitude is defined by the optical transfer function. In the optical transfer function, the signal amplitude decreases almost linearly as the spatial frequency becomes higher. The limit of reproduction at which the signal amplitude decreases to 0 is defined as the cutoff frequency of the optical transfer function. Then, the shortest mark frequency of a reproduced signal recorded in the information recording medium is in the vicinity of the cutoff frequency of the optical transfer function.

It is therefore possible to reproduce an optical disc in which information is recorded at a recording line density at which the shortest mark frequency is in the vicinity of the cutoff frequency of the optical transfer function.

Also, it is preferable for the phase error detecting device described above that the phase detection portion extracts, during the maximum likelihood decoding, the phase error using a partial response equalization ideal value at a second sample time at which influences of distortion of a waveform of an input signal are less than at a first sample time from the state transition patterns having only a single zero cross point among the differential metrics at a plurality of merging points at which a set of paths branched from a given state merges.

According to this configuration, the phase error is extracted during the maximum likelihood decoding using a partial response equalization ideal value at the second sample time at which influences of distortion of the waveform of an input signal are less than at the first sample time from the state transition patterns having only a single zero cross point among the differential metrics at a plurality of merging points at which a set of paths branched from a given state merges.

Accordingly, by extracting the phase error using the partial response equalization ideal value at the second sample time at which the influences of distortion of the waveform of an input signal are less than at the first sample time, it becomes possible to detect the phase error at satisfactory accuracy even when the phase displaces significantly.

Also, it is preferable for the phase error detecting device described above that: the first sample time includes a top sample time and a last sample time; the second sample time includes a sample time other than the top sample time and the last sample time; and the phase detection portion extracts, during the maximum likelihood decoding, the phase error using the partial response equalization ideal value at a sample time other than the top sample time and the last sample time from the state transition patterns having only a single zero cross point among the differential metrics at a plurality of merging points at which a set of paths branched from a given state merges.

According to this configuration, the phase error is extracted during the maximum likelihood decoding using a partial response equalization ideal value at a sample time other than the top sample time and the last sample time from the state transition patterns having only a single zero cross point among the differential metrics at a plurality of merging points at which a set of paths branched from a given state merges.

The partial response equalization ideal values at the top sample time and the last sample time are susceptible to distortion of the waveform of an input signal. Hence, by detecting the phase error using the partial response equalization ideal value at a sample time other than the top sample time and the last sample time, it becomes possible to detect the phase error at satisfactory accuracy.

Also, it is preferable for the phase error detecting device described above that the phase detection portion does not output the phase error to the synchronization detection portion in a case where the phase error that has been detected is larger than a predetermined threshold value.

According to this configuration, the phase error is not outputted to the synchronization detection portion in a case where the detected phase error is larger than the predetermined threshold value. It thus becomes possible to delete a phase error larger than the predetermined threshold value, which can cause a disturbance. Hence, a reproduction clock signal can be generated in a stable manner.

Also, it is preferable for the phase error detecting device described above that the waveform shaping portion includes a partial response equalization filter that equalizes the digital reproduced signal and an adaptive coefficient update portion that adaptively updates coefficients of the partial response equalization filter to have a desired partial response characteristic, and that the adaptive coefficient update portion updates the coefficients of the partial response equalization filter to be right-left symmetrical.

Also, it is preferable for the phase error detecting device described above that the adaptive coefficient update portion includes an error signal detection portion that generates an equalization error signal to update the coefficients of the partial response equalization filter, and that the error signal detection portion does not output the equalization error signal relating to a shortest mark or the equalization error signal equal to or larger than a predetermined value.

Also, it is preferable for the phase error detecting device described above that the adaptive coefficient update portion adaptively switches an LMS (The Least-Mean Square) algorithm and a frequency sampling algorithm in response to a state of the synchronization detection portion, so that the adaptive coefficient update portion updates the coefficients of the partial response equalization filter using one of the LMS algorithm and the frequency sampling algorithm.

Also, it is preferable for the phase error detecting device described above that the state of the synchronization detection portion includes a state in which frequency entrainment is controlled and a state in which phase entrainment is controlled in a process to bring the digital reproduced signal into synchronization with the reproduction clock signal.

Also, it is preferable for the phase error detecting device described above that the maximum likelihood decoding is a method having at least two pieces of edge information in state transition patterns having a smallest different metric among the differential metrics at a plurality of merging points at which a set of paths branched from a given state merges.

Also, it is preferable for the phase error detecting device described above that the phase detection portion detects the phase error by excluding state transition patterns that contain a shortest mark.

Also, it is preferable for the phase error detecting device described above that the phase detection portion changes the state transition patters used to detect the phase error in response to the state of the synchronization detection portion.

Also, it is preferable for the phase error detecting device described above that the state of the synchronization detection portion includes a state in which frequency entrainment is controlled and a state in which phase entrainment is controlled in a process to bring the digital reproduced signal into synchronization with the reproduction clock signal.

Also, it is preferable for the phase error detecting device described above that the synchronization detection portion is furnished with a capability of appending a predetermined gain to the phase error detected by the phase detection portion, normalizes the phase error with an ideal differential metric distance in a process to extract the phase error in the phase detection portion, and maintains the gain in a synchronization loop almost constant by lowering the gain when scattering of the phase error is large and by increasing the gain when the scattering of the phase error is small.

Also, it is preferable for the phase error detecting device described above that the synchronization detection portion is furnished with a capability of adaptively changing state transition patterns used to detect the phase error in the phase detection portion, normalizes the phase error with an ideal differential metric distance in a process to extract the phase information in the phase detection portion, and maintains the gain in a synchronization loop almost constant by making a change so as not to detect the phase error from state transition patters relating to a short mark when scattering of the phase error is large and by making a change so as to detect the phase error from the state transition patterns relating to the short mark when the scattering of the phase error is small.

A phase error detection method according to another aspect of the invention includes: a shaping step of receiving a digital reproduced signal generated from an analog reproduced signal reproduced from an information recording medium and shaping a waveform of the digital reproduced signal; a maximum likelihood decoding step of applying maximum likelihood decoding to the digital reproduced signal in the waveform shaped in the shaping step and generating a binarized signal indicating a result of the maximum likelihood decoding; a phase detecting step of detecting a phase error on the basis of the digital reproduced signal in the waveform shaped in the shaping step and the binarized signal generated in the maximum likelihood decoding step; and a synchronization detecting step of making synchronization with the reproduced signal using the phase error detected in the phase detecting step. In the phase detecting step, the phase error is extracted during the maximum likelihood decoding using state transition patterns having only a single zero cross point among differential metrics at a plurality of merging points at which a set of paths branched from a given state merges.

An optical disc device according still another aspect of the invention includes an optical head and the phase error detecting device described above. According to this configuration, it is possible to apply the phase error detecting device described above to an optical disc.

An optical disc device according to still another aspect of the invention includes: an A/D portion that generates s digital reproduced signal from an analog reproduced signal reproduced from an information recording medium; an AGC/OFFSET control portion that controls an amplitude and an offset so as to fall within a predetermined D range of the A/D portion; a waveform shaping portion that shapes a waveform of the digital reproduced signal generated by the A/D portion; a maximum likelihood decoding portion that applies maximum likelihood decoding to the digital reproduced signal in the waveform shaped by the waveform shaping portion and generates a binarized signal indicating a result of the maximum likelihood decoding; a phase detection portion that detects a phase error on the basis of the digital reproduced signal in the waveform shaped by the waveform shaping portion and the binarized signal generated by the maximum likelihood decoding portion; and a synchronization detection portion that generates a reproduction clock signal using the phase error detected by the phase detection portion and brings the digital reproduced signal into synchronization with the reproduction clock signal that has been generated. The waveform shaping portion includes: a partial response equalization filter that equalizes the digital reproduced signal; an adaptive coefficient update portion that adaptively updates coefficients of the partial response equalization filter so as to achieve a desired partial response characteristic; and synchronization entrainment control portion that controls an entrainment procedure for synchronization with the digital reproduced signal. The synchronization entrainment control portion does not activate the adaptive coefficient update portion or the phase detection portion until the AGC/OFFSET control portion converges within a predetermined range.

A waveform shaping device according to still another aspect of the invention includes: a finite impulse response filter that receives a digital reproduced signal generated from an analog reproduced signal reproduced from an information recording medium and shapes a waveform of the digital reproduced signal; an amplitude level detection portion that detects an N'th amplitude level from a predetermined reference level in an output of the finite impulse response filter; an amplitude error detection portion that detects a difference between the amplitude level detected by the amplitude level detection portion and a predetermined target amplitude; and a coefficient calculation portion that calculates coefficients of the finite impulse response filter on the basis of an output of the amplitude error detection portion. The coefficient calculation portion calculates the coefficients of the finite impulse response filter so that the output of the amplitude error detection portion reaches the predetermined target amplitude and updates the coefficients of the finite impulse response filter to the coefficients that have been calculated.

According to this configuration, a digital reproduced signal generated from an analog reproduced signal reproduced from an information recording medium is received and the waveform of the digital reproduced signal is shaped by the finite impulse response filter. The N'th amplitude level from the predetermined reference level in an output of the finite impulse response filter is detected by the amplitude level detection portion. Subsequently, a difference between the detected amplitude level and the predetermined target amplitude is detected by the amplitude error detection portion, and the coefficients of the finite impulse filter are calculated on the basis of an output of the amplitude error detection portion by the coefficient calculation portion. In this instance, the coefficients of the finite impulse response filter are calculated so that an output of the amplitude error detection portion reaches the predetermined target amplitude and the coefficients of the finite impulse response filter are updated to the coefficients that have been calculated by the coefficient calculation portion.

It thus becomes possible to shape a digital reproduced signal generated from an analog reproduced signal reproduced from an information recording medium into a waveform suitably used in the maximum likelihood decoding. Accuracy in detecting the phase error can be therefore enhanced, which makes it possible to generate a reproduction clock signal in a stable manner.

Also, it is preferable for the waveform shaping device described above that: the amplitude level detection portion includes a first amplitude level detection portion that detects an N'th amplitude level from a predetermined reference level in an output of the finite impulse response filter, and a second amplitude level detection portion that detects an M'th (M>N) amplitude level from the predetermined reference level in the output of the finite impulse response filter; the amplitude error detection portion includes a first amplitude error detection portion that detects a difference between the amplitude level detected by the first amplitude level detection portion and a first target amplitude, and a second amplitude error detection portion that detects a difference between the amplitude level detected by the second amplitude level detection portion and a second target amplitude different from the first target amplitude; and the coefficient calculation portion calculates the coefficients of the finite impulse response filter on the basis of outputs of the first amplitude error detection portion and the second amplitude error detection portion.

According to this configuration, the N'th amplitude level from the predetermined reference level in an output of the finite impulse response filter is detected by the first amplitude level detection portion. The M'th (M>N) amplitude level from the predetermined reference level in an output of the finite impulse response filter is detected by the second amplitude level detection portion. A difference between the amplitude level detected by the first amplitude level detection portion and the first target amplitude is detected by the first amplitude error detection portion. A difference between the amplitude level detected by the second amplitude level detection portion and the second target amplitude different from the first target amplitude is detected by the second amplitude error detection portion. Coefficients of the finite impulse response filter are calculated on the basis of the outputs of the first amplitude error detection portion and the second amplitude error detection portion by the coefficient calculation portion.

Hence, not only can a difference between the N'th amplitude level from the predetermined reference level in an output of the finite impulse response filter and the first target amplitude be detected, but also a difference between the M'th (M>N) amplitude level from the predetermined reference level in an output of the finite impulse response filter and the second target amplitude can be detected. Because the coefficients of the finite impulse response filter are calculated on the basis of these amplitude errors that have been detected, it becomes possible to calculate the coefficients of the finite impulse response filter in a more reliable manner.

Also, it is preferable for the waveform shaping device described above that the coefficient calculation portion updates the coefficients of the finite impulse response filter using a frequency sampling algorithm.

Also, it is preferable for the waveform shaping device described above that the finite impulse response filter is a digital filter holding coefficients of nine taps and controls five gains in predetermined frequency bands using the frequency sampling algorithm in such a manner that a gain in a lowest band is a gain of one, a gain in a second lowest band is controlled so that an output of the second amplitude error detection portion becomes smaller, a gain in a third lowest band is controlled so that an output of the first amplitude error detection portion becomes smaller, a gain in a fourth lowest band is controlled so that the output of the first amplitude error detection portion becomes smaller, and a gain in a fifth lowest band is a fixed gain of one or less.

Also, it is preferable for the waveform shaping device described above that the finite impulse response filter is a digital filter holding coefficients of seven taps and controls four gains in predetermined frequency bands using the frequency sampling algorithm in such a manner that a gain in a lowest band is a gain of one, a gain in a second lowest band is controlled so that an output of the second amplitude error detection portion becomes smaller, a gain in a third lowest band is controlled so that an output of the first amplitude error detection portion becomes smaller, and a gain in a fourth lowest band is a fixed gain of one or less.

A waveform shaping method according to still another aspect of the invention includes: a waveform shaping step of receiving a digital reproduced signal generated from an analog reproduced signal reproduced from an information recording medium and shaping a waveform of the digital reproduced signal by allowing the digital reproduced signal to pass through a finite impulse response filter; an amplitude level detecting step of detecting an N'th amplitude level from a predetermined reference level in an output of the finite impulse response filter; an amplitude error detecting step of detecting a difference between the amplitude level detected in the amplitude level detecting step and a predetermined target amplitude; and a coefficient calculating step of calculating coefficients of the finite impulse response filter on the basis of an output in the amplitude error detecting step. In the coefficient calculating step, the coefficients of the finite impulse response filter are calculated so that the output in the amplitude error detecting step reaches the predetermined target amplitude and the coefficients of the finite impulse response filter are updated to the coefficients that have been calculated.

An optical disc device according to still another aspect of the invention includes an optical head, and the waveform shaping device described above. According to this configuration, it is possible to apply the waveform shaping device described above to an optical disc.

The phase error detecting device, the waveform shaping device, and the optical disc device of the invention are able to generate a reproduction clock signal in a stable manner, and are therefore useful as a phase error detecting device, a waveform shaping device, and an optical disc device that perform signal processing using the maximum likelihood decoding method.

This application is based on Japanese Patent Application No. 2007-339921 filed on Dec. 28, 2007, the contents of which are hereby incorporated by reference.

It should be appreciated that specific embodiments or examples described in the detailed description of the invention are intended merely to make the technical contents of the invention clear. The invention therefore should not be understood in a narrow scope limited by such specific examples and the invention can be modified in various manners within the spirit of the invention and the scope of appended claims.

What is claimed is:

1. A phase error detecting device, comprising:
   a waveform shaping portion that receives a digital reproduced signal generated from an analog reproduced signal reproduced from an information recording medium and shapes a waveform of the digital reproduced signal;
   a maximum likelihood decoding portion that applies maximum likelihood decoding to the digital reproduced signal in the waveform shaped by the waveform shaping portion and generates a binarized signal indicating a result of the maximum likelihood decoding;
   a phase detection portion that detects a phase error on the basis of the digital reproduced signal in the waveform shaped by the waveform shaping portion and the binarized signal generated by the maximum likelihood decoding portion; and
   a synchronization detection portion that generates a reproduction clock signal using the phase error detected by the phase detection portion and brings the digital reproduced signal in synchronization with the reproduction clock signal that has been generated,
   wherein the phase detection portion extracts, during the maximum likelihood decoding, the phase error using state transition patterns having only a single zero cross point among differential metrics at a plurality of merging points at which a set of paths branched from a given state merges.

2. The phase error detecting device according to claim 1, wherein:
   a relation between a spatial frequency and a signal amplitude is defined by an optical transfer function, the signal amplitude decreases almost linearly as the spatial frequency becomes higher, and a limit of reproduction at which the signal amplitude decreases to 0 is defined as a cutoff frequency of the optical transfer function, then a shortest mark frequency of a reproduced signal recorded in the information recording medium is in a vicinity of the cutoff frequency of the optical transfer function.

3. The phase error detecting device according to claim 1, wherein:
   the phase detection portion extracts, during the maximum likelihood decoding, the phase error using a partial response equalization ideal value at a second sample time at which influences of distortion of a waveform of an input signal are less than at a first sample time from the state transition patterns having only a single zero cross point among the differential metrics at a plurality of merging points at which a set of paths branched from a given state merges.

4. The phase error detecting device according to claim 3, wherein:
   the first sample-time includes a top sample time and a last sample time;

the second sample time includes a sample time other than the top sample time and the last sample time; and the phase detection portion extracts, during the maximum likelihood decoding, the phase error using the partial response equalization ideal value at a sample time other than the top sample time and the last sample time from the state transition patterns having only a single zero cross point among the differential metrics at a plurality of merging points at which a set of paths branched from a given state merges.

5. The phase error detecting device according to claim 1, wherein:

the phase detection portion does not output the phase error to the synchronization detection portion in a case where the phase error that has been detected is larger than a predetermined threshold value.

6. An optical disc device, comprising:

an optical head; and the phase error detecting device set forth in claim 1.

\* \* \* \* \*